(12) United States Patent
Chiles et al.

(10) Patent No.: US 11,086,193 B1
(45) Date of Patent: Aug. 10, 2021

(54) SELF-REFERENCING NONLINEAR FREQUENCY CONVERTING PHOTONIC WAVEGUIDE AND SELF-REFERENCING NONLINEAR FREQUENCY CONVERSION

(71) Applicant: Government of the United States of America, as represented by the Secretary of Commerce, Gaithersburg, MD (US)

(72) Inventors: Jeffrey Taylor Chiles, Boulder, CO (US); Eric John Stanton, Boulder, CO (US); Ian Robert Coddington, Boulder, CO (US)

(73) Assignee: GOVERNMENT OF THE UNITED STATES OF AMERICA, AS REPRESENTED BY THE SECRETARY OF COMMERCE, Gaithersburg, MD (US)

(*) Notice: Subject to any disclaimer, the term of this patent is extended or adjusted under 35 U.S.C. 154(b) by 0 days.

(21) Appl. No.: 17/004,853

(22) Filed: Aug. 27, 2020

(51) Int. Cl.
 *G02F 1/37* (2006.01)
 *G02F 1/35* (2006.01)
 *G02F 1/365* (2006.01)

(52) U.S. Cl.
 CPC ............ *G02F 1/37* (2013.01); *G02F 1/3544* (2013.01); *G02F 1/365* (2013.01); *G02F 1/3507* (2021.01)

(58) Field of Classification Search
 CPC .................................................. G02F 1/3528
 See application file for complete search history.

(56) References Cited

U.S. PATENT DOCUMENTS

| 10,566,765 B2 * | 2/2020 | Kurczveil | H01S 5/1032 |
| 10,797,468 B2 * | 10/2020 | Kurczveil | H01S 5/1067 |
| 2017/0317471 A1 * | 11/2017 | Lor | G02B 6/124 |

OTHER PUBLICATIONS

I. Alamgir, M. H. M. Shamim, M. El Amraoui, Y. Messaddeq and M. Rochette, "Supercontinuum Generation in Suspended Core As2S3 Tapered Fiber," 2020 IEEE Photonics Conference (IPC), Vancouver, BC, Canada, 2020, pp. 1-2. (Year: 2020).*

Y. Zhang et al., "Supercontinuum Generation in Cascaded Photonic Crystal Fiber Tapers," 2019 18th International Conference on Optical Communications and Networks (ICOCN), Huangshan, China, 2019, pp. 1-3. (Year: 2019).*

(Continued)

*Primary Examiner* — Rhonda S Peace
(74) *Attorney, Agent, or Firm* — Office of Chief Counsel for National Institute of Standards and Technology

(57) ABSTRACT

A self-referencing nonlinear frequency converting photonic waveguide includes: a supercontinuum input optical taper; a supercontinuum nonlinear optical member that produces supercontinuum light spanning an optical octave with respect to input light; and a supercontinuum output optical taper; a second harmonic input optical taper; a second harmonic nonlinear optical member that receives the supercontinuum light and produces second harmonic light from the supercontinuum light, the second harmonic light including a second harmonic of the supercontinuum light; and a second harmonic output optical taper that receives the second harmonic light, the supercontinuum light, and the input light and co-propagates the second harmonic light, the supercontinuum light, and the input light from the second harmonic generator section as output light.

19 Claims, 20 Drawing Sheets

(56) References Cited

OTHER PUBLICATIONS

M. Malinowski et al., "Amplified octave-spanning supercontinuum from chalcogenide waveguides for second-harmonic generation," 2017 IEEE Photonics Conference (IPC), Orlando, FL, 2017, pp. 261-262. (Year: 2017).*

Hickstein, D., et al., "Ultrabroadband Supercontinuum Generation and Frequency-Comb Stabilization Using On-Chip Waveguides with Both Cubic and Quadratic Nonlinearities", Physical Review Applied, 2017, p. 014025, vol. 8.

Yu, M., et al., "Coherent two-octave-spanning supercontinuum generation in lithium-niobate waveguides", Optics Letters, 2019, p. 1222-1225, vol. 44 No. 5.

Jankowski, M., et al., "Ultrabroadband nonlinear optics in nanophotonic periodically poled lithium niobate waveguides", Optica, 2020, p. 40-46, vol. 7 No. 1.

Okawachi, Y., et al., "Chip-based self-referencing using integrated lithium niobate waveguides", Optica. 2020, p. 702-707, vol. 7 No. 6.

Stanton, E., et al., "Efficient second harmonic generation in nanophotonic GaAs-on-insulator waveguides", Optics Express, 2020, p. 9521-9532, vol. 28 No. 7.

Chiles, J., et al., "Multifunctional integrated photonics in the mid-infrared with suspended AlGaAs on silicon", Optica, 2019, p. 1246-1252, vol. 6 No. 9.

\* cited by examiner

SELF-REFERENCING NONLINEAR FREQUENCY CONVERTING PHOTONIC WAVEGUIDE AND SELF-REFERENCING NONLINEAR FREQUENCY CONVERSION

STATEMENT REGARDING FEDERALLY SPONSORED RESEARCH

This invention was made with United States Government support from the National Institute of Standards and Technology (NIST), an agency of the United States Department of Commerce and under the DARPA SCOUT and DARPA MTO DODOS programs. The Government has certain rights in the invention. Licensing inquiries may be directed to the Technology Partnerships Office, NIST, Gaithersburg, Md., 20899; voice (301) 975-2573; email tpo@nist.gov; reference U.S. Pat. No. 17/044,853.

BRIEF DESCRIPTION

Disclosed is a self-referencing nonlinear frequency converting photonic waveguide for self-referencing nonlinear frequency conversion, the self-referencing nonlinear frequency converting photonic waveguide comprising: a substrate; a dielectric layer disposed on the substrate with an input terminus at which input light propagates toward an output terminus opposingly disposed from the input terminus; a supercontinuum generator section disposed at the input terminus on the dielectric layer and comprising: $Al_xGa_yAs_z$; a supercontinuum input optical taper disposed at the input terminus and that receives input light, the supercontinuum input optical taper tapering toward the input terminus, a supercontinuum nonlinear optical member in optical communication with the supercontinuum input optical taper and that receives the input light from the supercontinuum input optical taper and produces supercontinuum light from the input light, the supercontinuum light spanning an optical octave with respect to the input light; and a supercontinuum output optical taper in optical communication with the supercontinuum nonlinear optical member and that receives the supercontinuum light and the input light from the supercontinuum nonlinear optical member and propagates the supercontinuum light and the input light from the supercontinuum generator section, the supercontinuum output, optical taper tapering away from the input terminus, a first height H1 relative to a surface of the dielectric layer on which the supercontinuum generator section is disposed; a first width W1 of supercontinuum nonlinear optical member orthogonal to a direction propagation of supercontinuum light in supercontinuum generator section; and a second harmonic generator section disposed on the supercontinuum output optical taper and the dielectric layer and that extends on the dielectric layer from the supercontinuum output optical taper towards the output terminus and comprising: $Al_xGa_yAs_z$ that provides birefringent modal phase matching, a second harmonic input optical taper disposed on the supercontinuum output optical taper and that receives the supercontinuum light and the input light from the supercontinuum output optical taper, the second harmonic input optical taper tapering toward the supercontinuum output optical taper; a second harmonic nonlinear optical member in optical communication with the second harmonic input optical taper and that receives the supercontinuum light and the input light from the second harmonic input optical taper and produces second harmonic light from the supercontinuum light and the input light, the second harmonic light comprising a second harmonic of the supercontinuum light, a second harmonic output optical taper disposed at the output terminus in optical communication with the second harmonic nonlinear optical member and that receives the second harmonic light, the supercontinuum light, and the input light from the second harmonic nonlinear optical member and co-propagates the second harmonic light, the supercontinuum light, and the input light from the second harmonic generator section toward the output terminus as output light, the second harmonic output optical taper tapering away from the second harmonic nonlinear optical member toward the output terminus, a second height H2 relative to the surface of the dielectric layer on which the second harmonic generator section is disposed; a second width W2 of supercontinuum nonlinear optical member orthogonal to a direction propagation of second harmonic light in the second harmonic generator section, such that the first height H1 is greater than or equal to the second height H2, and the first width W1 is less than or equal to second width W2.

Disclosed is a detector for detecting a frequency of a carrier envelope offset, the detector comprising: a self-referencing nonlinear frequency converting photonic waveguide comprising: a substrate; a dielectric layer disposed on the substrate with an input terminus at which input light propagates toward an output terminus opposingly disposed from the input terminus; a supercontinuum generator section disposed at the input terminus on the dielectric layer and comprising: $Al_xGa_yAs_z$; a supercontinuum input optical taper disposed at the input terminus and that receives input light, the supercontinuum input optical taper tapering toward the input terminus; a supercontinuum nonlinear optical member in optical communication with the supercontinuum input optical taper and that receives the input light from the supercontinuum input optical taper and produces supercontinuum light from the input light, the supercontinuum light spanning an optical octave with respect to the input light; and a supercontinuum output optical taper in optical communication with the supercontinuum nonlinear optical member and that receives the supercontinuum light and the input light from the supercontinuum nonlinear optical member and propagates the supercontinuum light and the input light from the supercontinuum generator section, the supercontinuum output optical taper tapering away from the input terminus, a first height H1 relative to a surface of the dielectric layer on which the supercontinuum generator section is disposed; a first width W1 of supercontinuum nonlinear optical member orthogonal to a direction propagation of supercontinuum light in supercontinuum generator section; and a second harmonic generator section disposed on the supercontinuum output optical taper and the dielectric layer and that extends on the dielectric layer from the supercontinuum output optical taper towards the output terminus and comprising: $Al_xGa_yAs_z$ that provides birefringent modal phase matching; a second harmonic input optical taper disposed on the supercontinuum output optical taper and that receives the supercontinuum light and the input light from the supercontinuum output optical taper, the second harmonic input optical taper tapering toward the supercontinuum output optical taper; a second harmonic nonlinear optical member in optical communication with the second harmonic input optical taper and that receives the supercontinuum light and the input light from the second harmonic input optical taper and produces second harmonic light from the supercontinuum light and the input light, the second harmonic light comprising a second harmonic of the supercontinuum light; a second harmonic output optical taper disposed at the output terminus in optical communication with the second harmonic nonlinear optical member and that receives the second harmonic light, the supercontinuum light, and the input light from the second harmonic nonlinear optical member and co-propagates the second harmonic light, the supercontinuum light, and the input light from the second harmonic generator section toward the output terminus, the second harmonic output optical taper tapering away from the second harmonic nonlinear optical member toward the output terminus; a second height H2 relative to the surface of the dielectric layer on which the second harmonic generator section is disposed; a second width W2 of supercontinuum nonlinear optical member orthogonal to a direction propagation of second harmonic light in the second harmonic generator section, such that the first height H1 is greater than or equal to the second height H2, and the first width W1 is less than or equal to second width W2, a wavelength splitter in optical communication with the self-referencing nonlinear frequency converting photonic waveguide and that: receives the output light from the self-referencing nonlinear frequency converting photonic waveguide; and produces combination signal and broadened spectrum from the output light; a photodetector in optical communication with the wavelength splitter and that receives the combination signal from the wavelength splitter and produces photosignal from the combination signal; a spectrum analyzer in electrical communication with the photodetector and that receives the photosignal and produces a analyzer signal from the photosignal; and an electrical stabilizer in electrical communication with the spectrum analyzer and that receives the analyzer signal from the spectrum analyzer, produces a feedback signal from the analyzer signal, and communicates the feedback signal to a laser source that produces the input light based on the feedback signal.

Disclosed is a process for self-referencing nonlinear frequency conversion with the self-referencing nonlinear frequency converting photonic waveguide of claim 1, the process comprising: receiving the input light by the supercontinuum input optical taper, communicating the input light from the supercontinuum input optical taper to the supercontinuum nonlinear optical member, receiving the input light by the supercontinuum nonlinear optical member subjecting, by the input light, the input light to anomalous group velocity dispersion; producing, by the supercontinuum nonlinear optical member, the supercontinuum light from the input light in response to subjecting the input light to the anomalous group velocity dispersion and birefringent phase matching in the supercontinuum nonlinear optical member; communicating the supercontinuum light and the input light from the supercontinuum nonlinear optical member to the supercontinuum output optical taper; receiving the input light and the supercontinuum light by the supercontinuum output optical taper and communicating the supercontinuum light and the input light from the supercontinuum output optical taper to the second harmonic input optical taper; receiving the input light and the supercontinuum light by the second harmonic input optical taper and communicating the supercontinuum light and the input light from the second harmonic input optical taper to the second harmonic nonlinear optical member; receiving the supercontinuum light and the input light by the second harmonic nonlinear optical member and producing, by the second harmonic nonlinear optical member, the second harmonic light from the supercontinuum light and the input light; and communicating the second harmonic light, the supercontinuum light, and the input light from the self-referencing nonlinear frequency converting photonic waveguide as output light; producing a feedback signal based on the output light; and producing the input light that is feedback stabilized by the feedback signal prior to receiving the input light by the supercontinuum input optical taper to perform self-referencing nonlinear frequency conversion.

BRIEF DESCRIPTION OF THE DRAWINGS

The following description should not be considered limiting in any way. With reference to the accompanying drawings, like elements are numbered alike.

DETAILED DESCRIPTION

Figure 1:
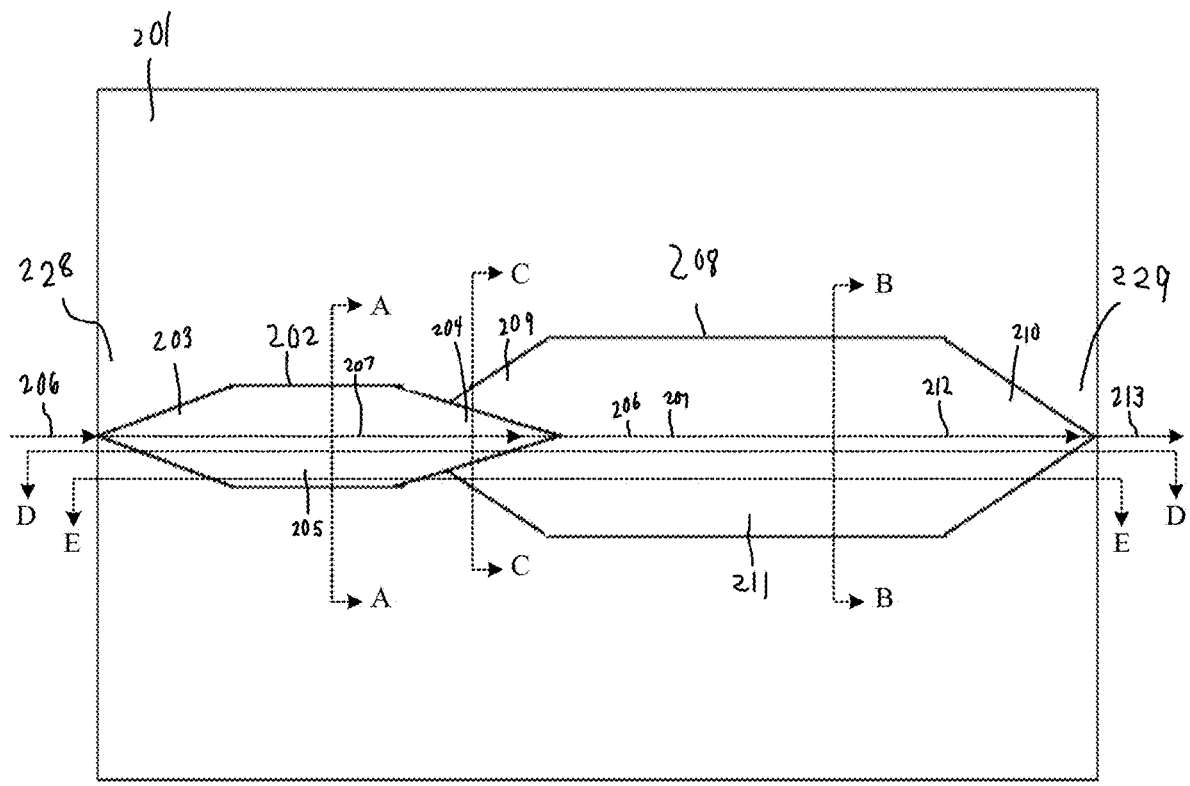
FIG. 1 shows a plan view of a self-referencing nonlinear frequency converting photonic waveguide.
Figure 1:
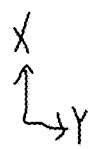
Figure 1:
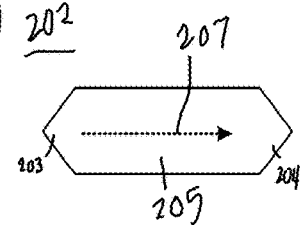
Figure 1:
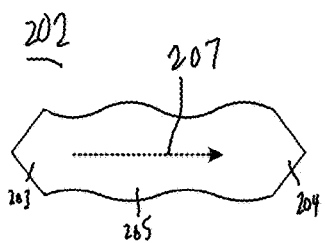
Figure 1:
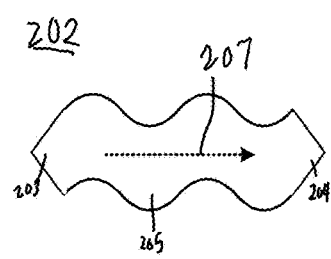
Figure 2:
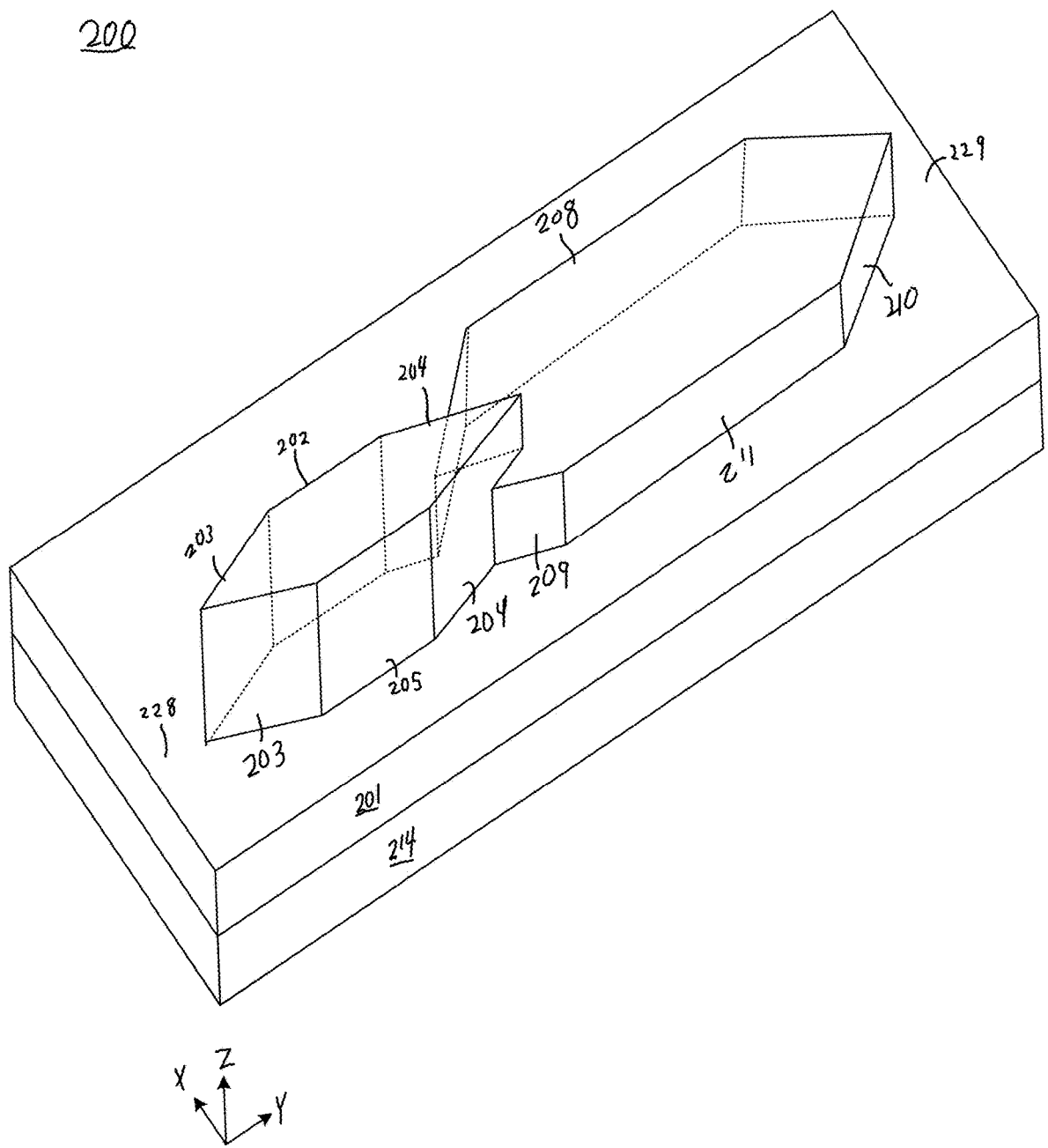
FIG. 2 shows a perspective view of a self-referencing nonlinear frequency converting photonic waveguide.
Figure 3:
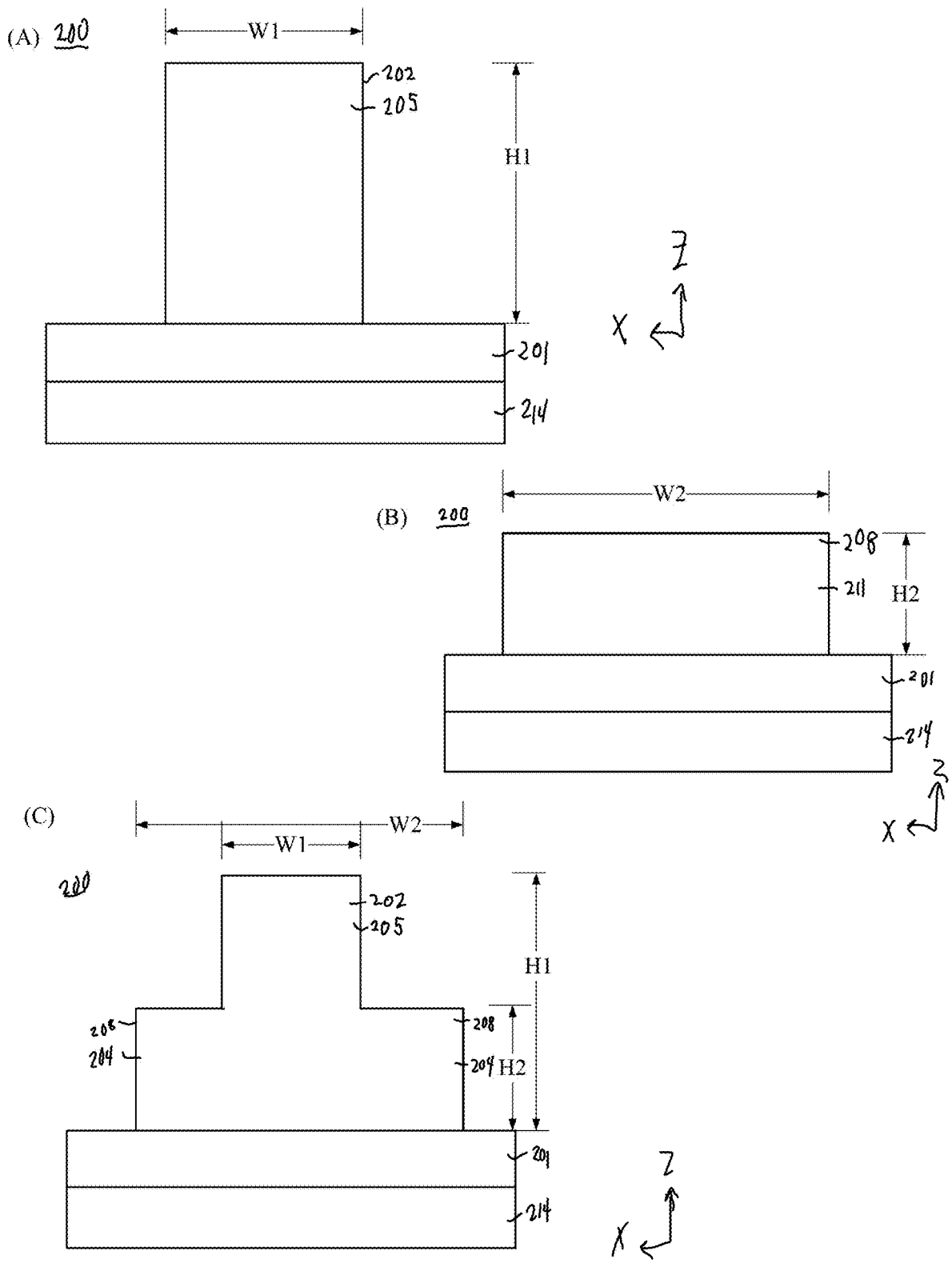
FIG. 3 shows, in panel A, a cross-section along line A-A of the self-referencing nonlinear frequency converting photonic waveguide shown in FIG. 1; in panel B, a cross-section along line B-B of the self-referencing nonlinear frequency converting photonic waveguide shown in FIG. 1; and in panel C a cross-section along line C-C of the self-referencing nonlinear frequency converting photonic waveguide shown in FIG. 1.
Figure 4:
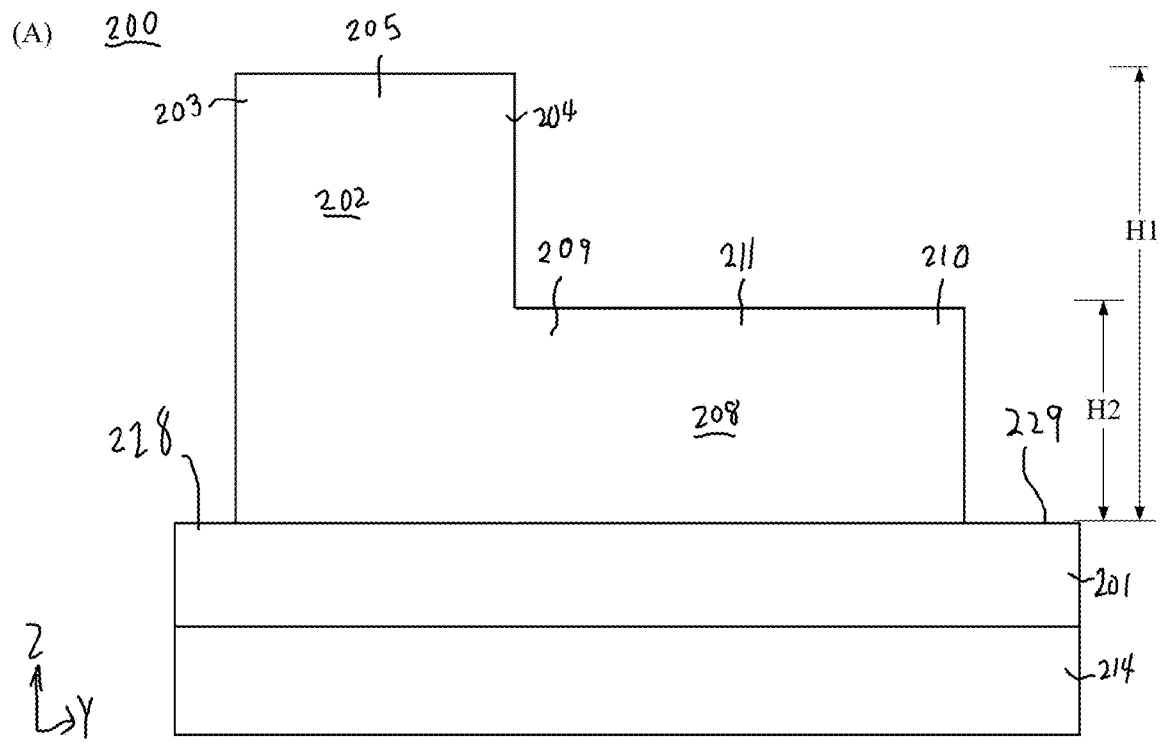
FIG. 4 shows, in panel A, a cross-section along line D-D of the self-referencing nonlinear frequency converting photonic waveguide shown in FIG. 1; and in panel B a cross-section along line E-E of the self-referencing nonlinear frequency converting photonic waveguide shown in FIG. 1
Figure 4:
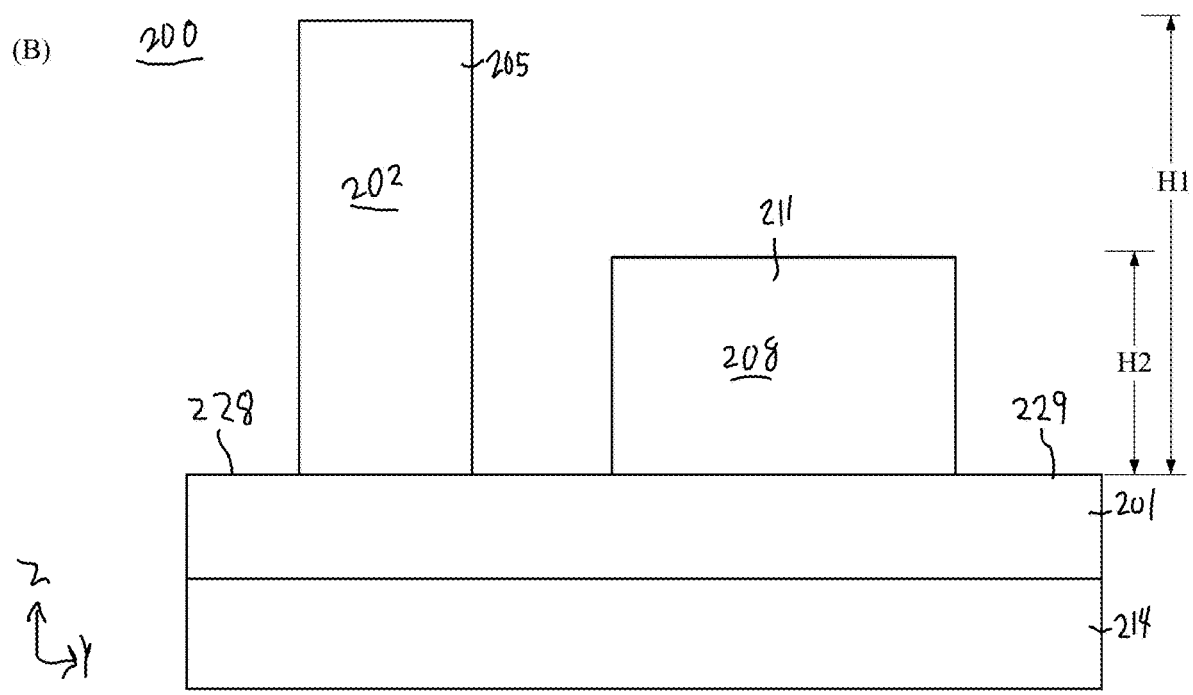

A detailed description of one or more embodiments is presented herein by way of exemplification and not limitation.

It has been discovered that a self-referencing nonlinear frequency converting photonic waveguide herein can be used in an optical frequency comb system and includes nano-scale photonic waveguides made of aluminum gallium arsenide ($Al_xGa_yAs_z$) that provided nonlinear frequency conversion for f-to-2f self-referencing. Frequency accuracy of a frequency-comb is provided by f-to-2f self-referencing, wherein an optical octave is generated, and the low-frequency range of the optical octave is frequency doubled and compared to the high frequency range of the optical octave to measure a frequency of a carrier envelope offset. In this manner, the frequency comb links radio frequencies and optical frequencies. In conventional frequency combs, pump diode lasers make a high-power pulse that forms the optical octave, and a waveguide doubler that include ppLN or ppKTP perform frequency doubling. Nonlinear material such as ppLN and ppKTP are expensive. Advantageously, the self-referencing nonlinear frequency converting photonic waveguide includes $Al_xGa_yAs_z$ and produces an optical octave of light from 1/100th the power of input light of conventional devices and decreases cost of construction and operation for frequency combs as compared with conventional devices that use pump diodes. Beneficially, the $Al_xGa_yAs_z$ waveguide of the self-referencing nonlinear frequency converting photonic waveguide is a waveguide doubler.

The self-referencing nonlinear frequency converting photonic waveguide includes a nanophotonic waveguide made of $Al_xGa_yAs_z$ that is integrated on a substrate. A propagation length of the waveguide is dispersion-engineered for supercontinuum generation from a pulsed pump laser, e.g., at 1560 nm, such that light is nonlinearly broadened to an octave, e.g., from 900 nm to 1800. A width of the $Al_xGa_yAs_z$ waveguide can be selectively tailored for cascaded second-order nonlinearities. Another portion of a propagation length of the waveguide produces second-harmonic generation by modulating the structure to neutralize momentum mismatch between fundamental light and second-harmonic light, e.g., 1800 nm fundamental light and 900 nm doubled light. Form-birefringent phase matching or mode-shape modulation that varies the width of the waveguide periodically can provide supercontinuum generation or second harmonic generation.

The waveguide can include edge couplers to optimize a coupling input efficiency of input light and coupling output efficiency for the second-harmonic light. Edge couplers can include tapered nanophotonic waveguides to expand a mode field diameter for coupling to tree-space or fiber-optic modes. It is contemplated that minimization of absorption losses at wavelengths from 800 nm to 1100 nm can include a silicon substrate with a layer of silicon dioxide thereon with an $Al_xGa_yAs_z$ waveguide having a thickness from 130 nm and 400 nm in an absence of material on top, referred to as an air-top-cladding. The waveguide can include $Al_xGa_yAs_z$ surrounded by gas on both the top and bottom, referred to as a suspended or fully air-clad device. The waveguide can be tethered to the substrate by a layer of $Al_xGa_yAs_z$ for index contrast, low coupling losses, and optical transparency from visible to mid-infrared wavelengths.

Self-referencing nonlinear frequency converting photonic waveguide 200 performs self-referencing nonlinear frequency conversion. In an embodiment, with reference to FIG. 1, FIG. 2, FIG. 3, and FIG. 4, self-referencing nonlinear frequency converting photonic waveguide 200 includes: substrate 214; dielectric layer 201 disposed on substrate 214 with input terminus 228 at which input light 206 propagates toward output terminus 229 opposingly disposed from input terminus 228; supercontinuum generator section 202 disposed at input terminus 228 on dielectric layer 201 and including: $Al_xGa_yAs_z$; supercontinuum input optical taper 203 disposed at input terminus 228 and that receives input light 206, supercontinuum input optical taper 203 tapering toward input terminus 228; supercontinuum nonlinear optical member 205 in optical communication with supercontinuum input optical taper 203 and that receives input light 206 from supercontinuum input optical taper 203 and produces supercontinuum light 207 from input light 206, supercontinuum light 207 spanning an optical octave with respect to input light 206; and supercontinuum output optical taper 204 in optical communication with supercontinuum nonlinear optical member 205 and that receives supercontinuum light 207 and input light 206 from supercontinuum nonlinear optical member 205 and propagates supercontinuum light 207 and input light 206 from supercontinuum generator section 202, supercontinuum output optical taper 204 tapering away from input terminus 228, first height H1 relative to a surface of dielectric layer 201 on which supercontinuum generator section 202 is disposed, first width W1 of supercontinuum nonlinear optical member 205 orthogonal to a direction propagation of supercontinuum light 207 in supercontinuum generator section 202, and second harmonic generator section 208 disposed on supercontinuum output optical taper 204 and dielectric layer 201 and that extends on dielectric layer 201 from supercontinuum output optical taper 204 towards output terminus 229 and including: $Al_xGa_yAs_z$ that provide birefringent modal phase matching; second harmonic input optical taper 209 disposed on supercontinuum output optical taper 204 and that receives supercontinuum light 207 and input light 206 from supercontinuum output optical taper 204, second harmonic input optical taper 209 tapering toward supercontinuum output optical taper 204; second harmonic nonlinear optical member 211 in optical communication with second harmonic input optical taper 209 and that receives supercontinuum light 207 and input light 206 from second harmonic input optical taper 209 and produces second harmonic light 212 from supercontinuum light 207 and input light 206, second harmonic light 212 including a second harmonic of supercontinuum light 207; second harmonic output optical taper 210 disposed at output terminus 229 in optical communication with second harmonic nonlinear optical member 211 and that receives second harmonic light 212, supercontinuum light 207, and input light 206 from second harmonic nonlinear optical member 211 and co-propagates second harmonic light 212, supercontinuum light 207, and input light 206 from second harmonic generator section 208 toward output terminus 229 as output light 213, second harmonic output optical taper 210 tapering away from second harmonic nonlinear optical member 211 toward output terminus 229; second height H2 relative to the surface of dielectric layer 201 on which second harmonic generator section 208 is disposed; second width W2 of supercontinuum nonlinear optical member 205 orthogonal to a direction propagation of second harmonic light 212 in second harmonic generator section 208, such that first height H1 is greater than or equal to second height H2, and first width W1 is less than or equal to second width W2.

Components of self-referencing nonlinear frequency converting photonic waveguide 200 can be made from and include various materials. Substrate 214 provides mechanical structure for disposition of other elements of self-referencing nonlinear frequency converting photonic waveguide 200 thereon. Substrate 214 can include a semiconductors such as silicon or gallium arsenide, metal, plastic, glass, ceramic, polymer, and the like. A thickness of substrate 214 can be from 100 µm to 1 cm, specifically from 10 µm to 2 mm, and more specifically from 300 µm to 1000 µm. In an embodiment, substrate 214 is silicon.

Dielectric layer 201 is disposed on substrate 214 and optimizes the guided optical mode through supercontinuum generator section 202 and second harmonic generator section 208. Dielectric layer 201 can include a high dielectric material such as a condensed medium (e.g., silicon dioxide as shown in FIG. 1-FIG. 5), gas (e.g., air as shown in FIG. 6), and the like. A thickness of dielectric layer 201 can be from 500 nm to 100 µm, specifically from 1 µm to 10 µm, and more specifically from 1 µm to 4 µm. In an embodiment, dielectric layer 201 is silicon dioxide. In certain embodiments, with reference to FIG. 6, dielectric layer 201 is a gas, and supercontinuum generator section 202 and second harmonic generator section 208 are suspended from feedback signal 217 and separated by a gap filled with the gas. A pressure of the gas can be from 1e-9 Torr to 5000 Torr, specifically from 1e-3 Torr to 1000 Torr.

Supercontinuum generator section 202 and second harmonic generator section 208 are monolithic, made of a single piece of $Al_xGa_yAs_z$ that provides a nonlinear optical medium and provides birefringent modal phase matching. As a result, light (e.g., input light 206, supercontinuum light 207, second harmonic light 212) propagating in supercontinuum generator section 202 or second harmonic generator section 208 has an optical mode with anomalous group velocity dispersion provided by $Al_xGa_yAs_z$. Supercontinuum input optical taper 203 and second harmonic generator section 208 independently provide a selected retractive index with low optical loss so the optical mode is efficiently guided through respective supercontinuum input optical taper 203 and second harmonic generator section 208 without radiating light toward dielectric layer 201 or substrate 214. Supercontinuum input optical taper 203 and second harmonic generator section 208 independently can have an elemental composition of aluminum in an amount from 0 atomic percent (at. %) to 99.9 at. %, specifically from 1 at. % to 50 at. %, and more specifically from 5 at. % to 40 at. %, based on a total of all atoms in this layer; gallium in an amount from 1 at. % to 55 at. %, specifically from 10 at. % to 55 at. %, based on a total of all atoms in this layer, and arsenic in an amount from 1 at. % to 55 at. %, specifically from 10 at. % to 55 at. %, based on a total of all atoms in this layer. First height H1 of supercontinuum input optical taper 203 can be from 50 nm to 5000 nm, specifically from 80 nm to 1000 nm, and more specifically from 100 nm to 400 nm. First width W1 of supercontinuum input optical taper 203 can be from 100 nm to 5000 nm, specifically from 200 nm to 2000 nm, and more specifically from 250 nm to 800 nm. Second height H2 of supercontinuum output optical taper 204 can be from 50 nm to 2000 nm, specifically from 80 nm to 500 nm, and more specifically from 90 nm to 400 nm. Second width W2 of supercontinuum output optical taper 204 can be from 200 nm to 6000 nm, specifically from 300 nm to 2000 nm, and more specifically from 1000 nm to 1600 nm.

It is contemplated that propagation length in the direction of the Y-axis in FI. 2 of supercontinuum generator section 202 and second harmonic generator section 208 independently can be from 10 µm to 200 mm, specifically from 100 µm to 20 mm, and more specifically from 1 mm to 10 mm.

Supercontinuum generator section 202 includes supercontinuum input optical taper 203 and supercontinuum output optical taper 204 between which is interposed supercontinuum nonlinear optical member 205. Supercontinuum input optical taper 203 and supercontinuum output optical taper 204 guide light into and out of supercontinuum generator section 202. An angle between tapered walls of supercontinuum input optical taper 203 or supercontinuum output optical taper 204 and a center axis of supercontinuum generator section 202 independently can be from 0° to 150°, specifically from 45° to 120°, and more specifically from 70° to 110°.

Second harmonic generator section 208 includes second harmonic input optical taper 209 and second harmonic output optical taper 210 between which is interposed second harmonic nonlinear optical member 211. Second harmonic input optical taper 209 and second harmonic output optical taper 210 guide light into and out of second harmonic generator section 208. An angle between tapered walls of second harmonic input optical taper 209 or second harmonic nonlinear optical member 211 and a center axis of second harmonic generator section 208 independently can be from 0° to 150°, specifically from 45° to 120°, and more specifically from 70° to 110°.

Supercontinuum nonlinear optical member 205 guides light from supercontinuum input optical taper 203 to supercontinuum output optical taper 204 and produces supercontinuum light 207 from input light 206. Production of supercontinuum light 207 can occur photophysically through supercontinuum nonlinear optical member 205 and a wavelength under which supercontinuum light 207 is produced from input light 206 can be selected by a physical size and geometry of supercontinuum nonlinear optical member 205. In an embodiment, a width of supercontinuum nonlinear optical member 205 from supercontinuum input optical taper 203 to supercontinuum output optical taper 204 can vary in a continuous (panel B of FIG. 1) or undulating contoured shape (as shown in panels C and D of FIG. 1) as viewed along Z-axis shown in the plan views of FIG. 1.

Second harmonic nonlinear optical member 211 guides light from second harmonic input optical taper 209 to second harmonic output optical taper 210 and produces second harmonic light 212 from supercontinuum light 207. Production of second harmonic light 212 can occur photophysically through second harmonic nonlinear optical member 211 and a wavelength under which second harmonic light 212 is produced from supercontinuum light 207 can be selected by a physical size and geometry of second harmonic nonlinear optical member 211.

Input light 206 can have a wavelength from 1100 nm to 16000 nm, specifically from 1200 nm to 5000 nm, and more specifically from 1250 nm to 2500 nm. Supercontinuum light 207 produced from input light 206 can have a wavelength from 600 nm to 16000 nm, specifically from 600 nm to 6000 nm, and more specifically from 650 nm to 3000 nm. Second harmonic nonlinear optical member 211 produced from supercontinuum light 207 can have a wavelength from 600 nm to 8000 nm, specifically from 600 nm to 6000 nm, and more specifically from 650 nm to 3000 nm. It is contemplated that output light 213 propagates from self-referencing nonlinear frequency converting photonic waveguide 200 and includes input light 206, supercontinuum light 207, and second harmonic light 212. A pulse width of light (206, 207, 212, 213) independently can be from 2 fs to 100 ps, specifically from 10 fs to 10 ps and more specifically from 50 fs to 5 ps. An average power of light (206, 207, 212, 213) independently can be from 0.01 mW to 200 mW, specifically from 0.05 mW to 50 mW, and more specifically from 0.1 mW to 10 mW.

Figure 5:
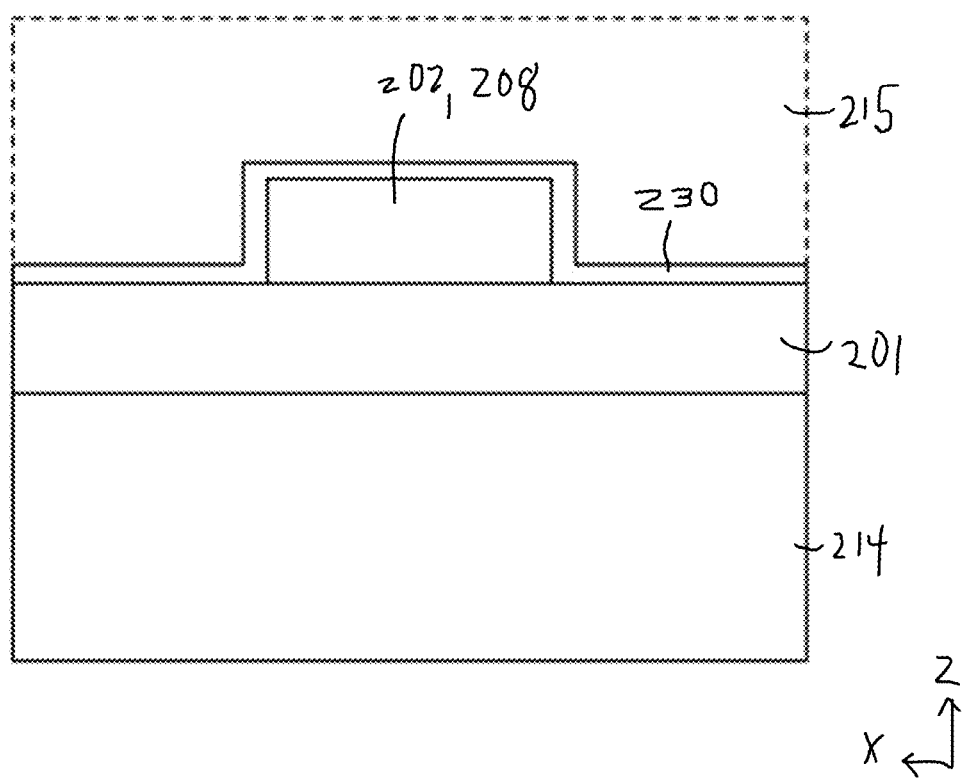
FIG. 5 shows a self-referencing nonlinear frequency converting photonic waveguide.
Figure 6:
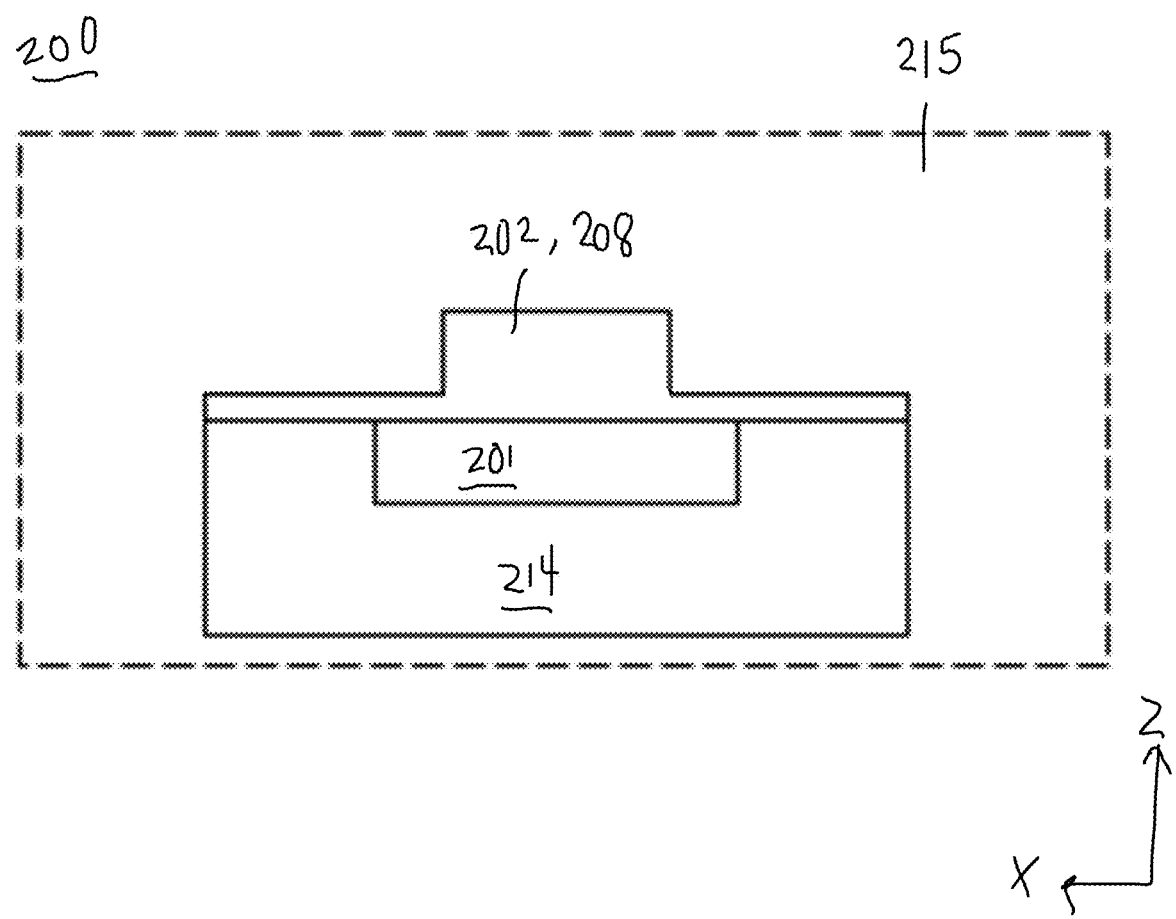
FIG. 6 shows a self-referencing nonlinear frequency converting photonic waveguide.

In an embodiment, with reference to FIG. 5, self-referencing nonlinear frequency converting photonic waveguide 200 includes passivation layer 230 disposed on supercontinuum generator section 202 and second harmonic generator section 208. Passivation layer 230 provides passivation to self-referencing nonlinear frequency converting photonic waveguide 200 from second dielectric medium 215 and can include silicon dioxide, aluminum oxide, aluminum nitride, hafnium oxide, silicon nitride, titanium oxide, tantalum pentoxide, calcium fluoride, and the like. A thickness of passivation layer 230 can be from 1 nm to 1 μm, specifically from 1 nm to 100 nm, and more specifically from 2 nm to 10 nm.

Second dielectric medium 215 provides physical encapsulation or additional surface passivation and can include silicon dioxide, aluminum oxide, aluminum nitride, hafnium oxide, silicon nitride, titanium oxide, tantalum pentoxide, calcium fluoride, and the like. A thickness of second dielectric medium 215 can be from 1 nm to 1 μm, specifically from 100 nm to 5000 nm, and more specifically from 200 nm to 3000 nm.

Figure 7:
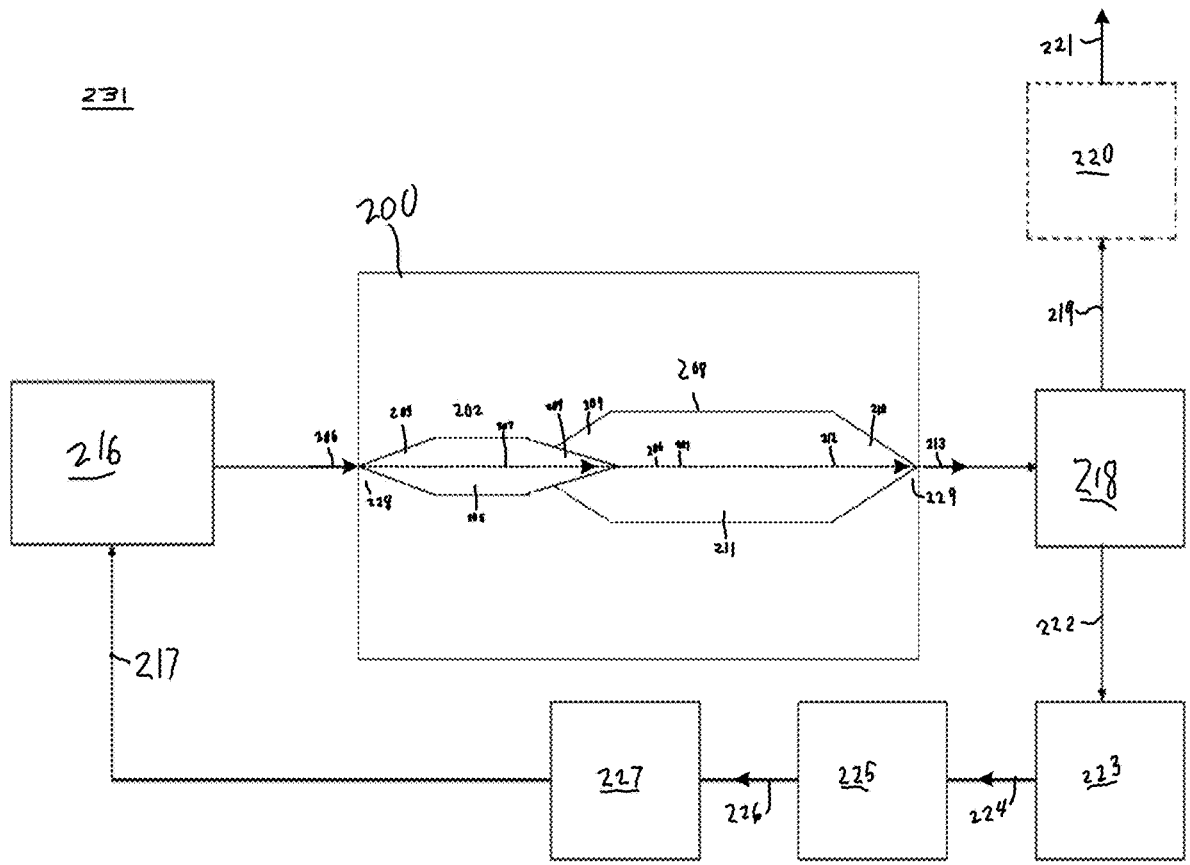
FIG. 7 shows a detector.
Figure 8:
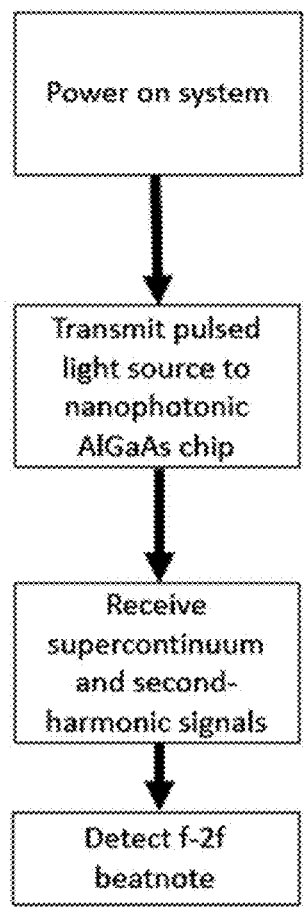
FIG. 8 shows a flow chart for self-referencing nonlinear frequency conversion.

In an embodiment, with reference to FIG. 7, laser source 216 produces input light 206. Exemplary laser sources 216 include semiconductor diode lasers, fiber lasers, solid-state lasers, and the like. A repetition rate of laser source 216 can be from 10 KHz to 1 THz specifically from 1 MHz to 100 GHz, and more specifically from 10 MHz to 10 GHz.

Operation of laser source 216 is controlled by feedback signal 217 that can include current, voltage, or light. Control occurs by adjusting the cavity length through temperature tuning, physical compression or expansion of the cavity's total length, or tuning of the refractive index of the media within the laser cavity.

Output light 213 produced by self-referencing nonlinear frequency converting photonic waveguide 200 is received by wavelength splitter 218. Wavelength splitter 218 can include chip-integrated elements or fiber-integrated components to produce broadened spectrum 219 and combination signal 222.

Broadened spectrum 219 includes some of the spectrum generated by supercontinuum generation, in an absence of less than 50% of the optical power contained in the dispersive wave of the supercontinuum spectrum and the light generated in the second harmonic. Spectrum 219 can be used in various articles such as a remote sensing device, a chemical analysis device, and the like, among other applications.

Combination signal 222 can include light produced supercontinuum and second harmonic generation and can include discrete optical frequency tones, with a frequency from the supercontinuum-broadened and a frequency from second-harmonic spectra, separated from each other by a small frequency, for example from 1 Hz to 100 GHz, more specifically from 1 Hz to 200 MHz.

Photodetector 223 receives combination signal 222 and produces photosignal 224 therefrom. Photodetector 223 can include a photo-sensing element, an optical window, control or interface electronics, temperature control subsystems, and the like. Exemplary photodetectors 223 include semiconductor photodiodes, plasmonic photoreceivers, and the like.

Photosignal 224 includes an electrical beat-note including a sinusoidal waveform centered at a frequency corresponding to the frequency-difference between the adjacent optical tones from the supercontinuum-broadened and second-harmonic spectra, respectively. Spectrum analyzer 225 receives photosignal 224 and produces analyzer signal 226 therefrom. Spectrum analyzer 225 can include analog and digital control and frequency analysis electronic subsystems.

Analyzer signal 226 includes the average frequency of the beat-note frequency, also referred to as carrier envelope offset frequency, represented in a digital or analog form for use by electrical stabilizer 227.

Electrical stabilizer 227 receives analyzer signal 226 and produces feedback signal 217 therefrom. Electrical stabilizer 227 can include a microprocessor unit, such as an FPGA or DSP processor, or a computer.

Self-referencing nonlinear frequency converting photonic waveguide 200 can be made in various ways. In an embodiment a process for making self-referencing nonlinear frequency converting photonic waveguide 200 includes providing substrate 214; forming dielectric layer 201 on substrate 214 by thermal oxidation, chemical vapor deposition, or sputtering; forming a layer of $Al_xGa_yAs_z$ on dielectric layer 201 by epitaxial growth followed by wafer bonding and etch-back of a donor substrate; forming supercontinuum generator section 202 by: removing a portion of the layer of $Al_xGa_yAs_z$ to form supercontinuum input optical taper 203 by plasma etching, ion beam milling or wet chemical etching, removing a second portion of the layer of $Al_xGa_yAs_z$ to form supercontinuum output optical taper 204 and second harmonic input optical taper 209 by plasma etching, ion beam milling or wet chemical etching; forming second harmonic generator section 208 by further removing material from the layer of $Al_xGa_yAs_z$ to form second harmonic output optical taper 210 and second harmonic nonlinear optical member 211 by plasma etching, ion beam milling or wet chemical etching; and optionally forming passivation layer 230 on supercontinuum generator section 202 and second harmonic generator section 208 by sputtering, atomic-layer deposition, chemical vapor deposition, or epitaxial growth.

It will be appreciated that in making self-referencing nonlinear frequency converting photonic waveguide 200 elements thereof are arranged with components to be in communication so that supercontinuum light 207 propagates from supercontinuum nonlinear optical member 205 with production of and reception of by and arranging optical components to be in optical communication and electrical components to communicate electrical signals amongst the various electrical components.

Self-referencing nonlinear frequency converting photonic waveguide 200 has numerous advantageous and unexpected benefits and uses. In an embodiment, a process for self-referencing nonlinear frequency conversion with self-referencing nonlinear frequency converting photonic waveguide 200 includes: receiving input light 206 by supercontinuum input optical taper 203 by coupling to a focused free-space optical beam or fiber-optic waveguide; communicating input light 206 from supercontinuum input optical taper 203 to supercontinuum nonlinear optical member 205 by optical waveguide propagation; receiving input light 206 by supercontinuum nonlinear optical member 205 by optical waveguide propagation; subjecting, by input light 206, input light 206 to anomalous group velocity dispersion by optical waveguide propagation, producing, by supercontinuum nonlinear optical member 205, supercontinuum light 207 from input light 206 in response to subjecting input light 206 to the anomalous group velocity dispersion and birefringent phase matching in supercontinuum nonlinear optical member 205 by optical waveguide propagation, communicating supercontinuum light 207 and input light 206 from supercontinuum nonlinear optical member 205 to supercontinuum output optical taper 204 by optical waveguide propagation; receiving input light 206 and supercontinuum light 207 by supercontinuum output optical taper 204 and communicating supercontinuum light 207 and input light 206 from supercontinuum output optical taper 204 to second harmonic input optical taper 209 by optical waveguide propagation; receiving input light 206 and supercontinuum light 207 by second harmonic input optical taper 209 and communicating supercontinuum light 207 and input light 206 from second harmonic input optical taper 209 to second harmonic nonlinear optical member 211 by optical waveguide propagation; receiving supercontinuum light 207 and input light 206 by second harmonic nonlinear optical member 211 and producing, by second harmonic nonlinear optical member 211, second harmonic light 212 from supercontinuum light 207 and input light 206 by optical waveguide propagation; and communicating second harmonic light 212, supercontinuum light 207, and input light 206 from self-referencing nonlinear frequency converting photonic waveguide 200 as output light 213 by coupling to a free-space beam or an fiber-optic waveguide by propagation through the output optical taper 210, producing feedback signal 217 based on output light 213 by optical interference and electrical detection on photoreceiver 223; and producing input light 206 that is feedback stabilized by feedback signal 217.

In the process for self-referencing nonlinear frequency conversion, producing, by the supercontinuum nonlinear optical member 205, the supercontinuum light 207 includes making an optical octave in the supercontinuum nonlinear optical member 205 from the input light 206 by nonlinear optical broadening processes including four-wave-mixing, self-phase modulation, and others. The spectrum spans at least one optical octave, the frequency range including, e.g., 2.4 times the input light 206 frequency to 0.4 times the pump frequency, or more specifically 2.4 times the input light 206 to 0.8 times the pump frequency, or alternatively 1.7 times the pump frequency to 0.6 times the pump frequency, or any subset of these frequency ranges spanning at least one octave in frequency.

In the process for self-referencing nonlinear frequency conversion producing, by second harmonic nonlinear optical member 211, second harmonic light 212 includes frequency doubling a low frequency range of supercontinuum light 207 nonlinear interaction with the $Al_xGa_yAs_z$ material via second-order optical nonlinearities.

In an embodiment, the process for self-referencing nonlinear frequency conversion further includes measuring the frequency of the carrier envelop offset by comparing second harmonic light 212 to a high frequency range of supercontinuum light 207 to perform f-to-2f self-referencing by optical interference and subsequent electrical detection. As used herein f-to-2f refers to the optical doubling of an optical frequency. Further, self-referencing the comparison and determination of the carrier-envelope offset of a mode-locked laser system.

In an embodiment, the process for self-referencing nonlinear frequency conversion further includes receiving, by wavelength splitter 218, output light 213 from self-referencing nonlinear frequency converting photonic waveguide 200 by optical coupling; and producing, by wavelength splitter 218, combination signal 222 and broadened spectrum 219 from output light 213 by optical spectral demultiplexing.

In an embodiment, the process for self-referencing nonlinear frequency conversion further includes receiving, by photodetector 223, combination signal 222 from wavelength splitter 218 by optical coupling, and producing, by photodetector 223, photosignal 224 from combination signal 222 by optical interference and electrical detection.

In an embodiment, the process for self-referencing nonlinear frequency conversion further includes receiving, by spectrum analyzer 225, photosignal 224 by electrical coupling; and producing, by spectrum analyzer 225, analyzer signal 226 from photosignal 224 by electrical coupling.

In an embodiment, the process for self-referencing nonlinear frequency conversion further includes receiving, by electrical stabilizer 227, analyzer signal 226 from spectrum analyzer 225 by electrical coupling; producing, by electrical stabilizer 227, feedback signal 217 from analyzer signal 226 by digital or analog signal processing or transduction to digital electronic or analog electronic or the optical domain; communicating, by electrical stabilizer 227, feedback signal 217 to laser source 216 by electrical or optical coupling; and producing, by laser source 216, input light 206 based on feedback signal 217 by adjustment of the effective cavity length in the laser source 216.

Self-referencing nonlinear frequency converting photonic waveguide 200 and processes disclosed herein have numerous beneficial uses, including realizing a coherent and stabilized broadband optical frequency spectrum. Advantageously, self-referencing nonlinear frequency converting photonic waveguide 200 overcomes limitations of technical deficiencies of conventional compositions such as fabrication complexity (by a single layer of $Al_xGa_yAs_z$ which provides the optical nonlinearity) and efficient coupling between all elements of self-referencing nonlinear frequency converting photonic waveguide 200.

It should be appreciated that self-referencing nonlinear frequency converting photonic waveguide 200 and self-referencing nonlinear frequency conversion solves the problem of inherently high power consumption and physical space consumed by conventional f-to-2f self-referencing devices and methods. Conventional devices include ppLN crystals that suffer significant coupling losses and operate under high threshold optical power, wherein nonlinear broadening can require an optical amplifier to reach a level of optical intensity that can be required to broaden light to one octave in conventional nonlinear fiber. Advantageously, self-referencing nonlinear frequency converting photonic waveguide 200 includes $Al_xGa_yAs_z$ waveguides to produce octave-spanning supercontinuum spectra and simultaneously achieve second-harmonic generation at pump pulse energies compatible with a fiber mode-locked oscillator operating at a repetition rate of ~100-200 MHz in an absence of optical amplification and provides much smaller devices with very low power consumption compared to conventional designs. In an embodiment, octave-spanning supercontinuum generation and simultaneous second-harmonic generation occurs at pump pulse energies of 3 pJ or 0.5 mW of average power with $Al_xGa_yAs_z$ nanophotonic waveguides that have thickness uniformity for efficient and predictable second harmonic generation, high second-order optical nonlinearity compared with many crystalline materials, high third-order nonlinearity for efficient supercontinuum generation, compact mode volume for reduction in minimum pump pulse energy with fewer components for f-to-2f self-referencing with comparison to conventional devices in an absence of the $Al_xGa_yAs_z$ waveguides.

Self-referencing nonlinear frequency converting photonic waveguide 200 and processes herein unexpectedly provides components for realization of a self-reference mode-locked laser system or frequency comb with low power consumption, by taking advantage of the strong third- and second-order optical nonlinearities which can be simultaneously designed to be taken advantage of in a sequence on one monolithic optical chip. By utilizing $Al_xGa_yAs_z$ as the core material of the waveguide, the strong waveguide dispersion can be controlled due to refractive index contrast of the surrounding optical medium to provide engineered supercontinuum production. Moreover, due to the nonlinear optical tensor of $Al_xGa_yAs_z$, the waveguide cross-section can be engineered to produce birefringent modal phase matching of a fundamental and second harmonic optical mode in orthogonal polarization modes, providing simple realization of modal phase matching that can be difficult to produce in conventional optical media, as conventionally done with more complex processes such as higher-order optical modal phase matching, periodic poling, and the like.

The articles and processes herein are illustrated further by the following Examples, which are non-limiting.

EXAMPLES

Example 1

Microscale integration of mid- and long-wave-infrared photonics could enable the development of biddable, robust chemical sensors, as well as highly efficient infrared frequency converters. However, such technology would be defined by the choice of material platform, which immediately determines the strength and types of optical nonlinearities available, the optical transparency window, modal confinement, and physical robustness. Suspended $Al_xGa_yAs_z$ waveguides integrated on silicon provide excellent performance in all of these metrics. We demonstrate low propagation losses within a span of nearly two octaves (1.26-4.6 μm) with exemplary performance of 0.45 dB/cm at λ=2.4 μm. We exploit the high nonlinearity of this platform to demonstrate 1560 nm-pumped second-harmonic generation and octave-spanning supercontinuum reaching out to 2.3 μm with 3.4 pJ pump pulse energy. With mid-IR pumping, we generate supercontinuum spanning from 2.3 to 6.5 μm. Finally, we demonstrate the versatility of the platform with mid-infrared passive devices such as low-loss 10 μm-radius bends, compact power splitters with 96±1% efficiency, and edge couplers with 3.0±1 dB loss. This platform has strong potential for multifunctional integrated photonic systems in the mid-infrared.

The mid- and long-wave-infrared (mid-IR and LWTR) spectral regions from λ=3-8 and 8-15 μm are critical spectral regions for sensitive spectroscopic analysis of a variety of physical compounds, such as complex molecular solids, gaseous species, and liquid mixtures. Optical frequency combs in particular have been used to achieve broadband spectroscopy with exquisite frequency resolution. However, broadband mid-IR comb technology is still maturing, and nearly all systems would greatly benefit from increased spectral coverage, lower power operation, and improved robustness. Consequently, there has been a consistent push over the past decade to transition mid-IR comb systems or subsystems to compact and robust chip-scale platforms. In particular, the small modal area and long propagation lengths of integrated nanophotonic waveguides motivate the development of integrated frequency converters to extend the spectral reach of combs, often with negligible power burdens.

Development of integrated mid-IR photonic systems for these applications depends on many factors, such as the material platform. A subset of materials has suitable optical transparency, and strong optical nonlinearities are also required for the generation, or broadening of frequency combs in the mid-IR. While Kerr nonlinearity is present in silicon, germanium, and chalcogenide materials, they lack intrinsic second-order optical nonlinearities for highly efficient frequency conversion and electro-optic modulation.

Alternatively, group III-V materials possess many desirable properties for multifunctional integrated photonic systems, including a high refractive index, strong second- and third-order optical nonlinearities, and wide optical transparency windows into the LWIR. A practical advantage of these materials is the ability to grow a chemically selective etch stop underneath a high-quality epitaxial device (donor) film, enabling wafer or chip-bonding film transfer techniques for heterogeneous integration. This has enabled high-index-contrast III-V waveguides on other substrates such as oxidized silicon and sapphire. However, to take full advantage of the broad transparency window supported by III-V semiconductors in a high-index contrast environment, it is necessary to pursue alternative geometries such as air-clad suspended waveguides. Materials can form surface oxide layers that also introduce absorption. Undercut etching has been used to suspend GaAs waveguides engineered for mid-IR difference frequency generation. While this represents a promising step in the development of nonlinear mid-IR photonics with III-V materials, many issues remain, such as the propagation loss in the mid-IR region, atmospheric stability, coupling losses, and amenability to wafer-scale production. Without thick cladding layers protecting the surface, suspended III-V waveguides become susceptible to several strong mid-IR and LWIR absorption bands from surface oxidation.

Figure 9:
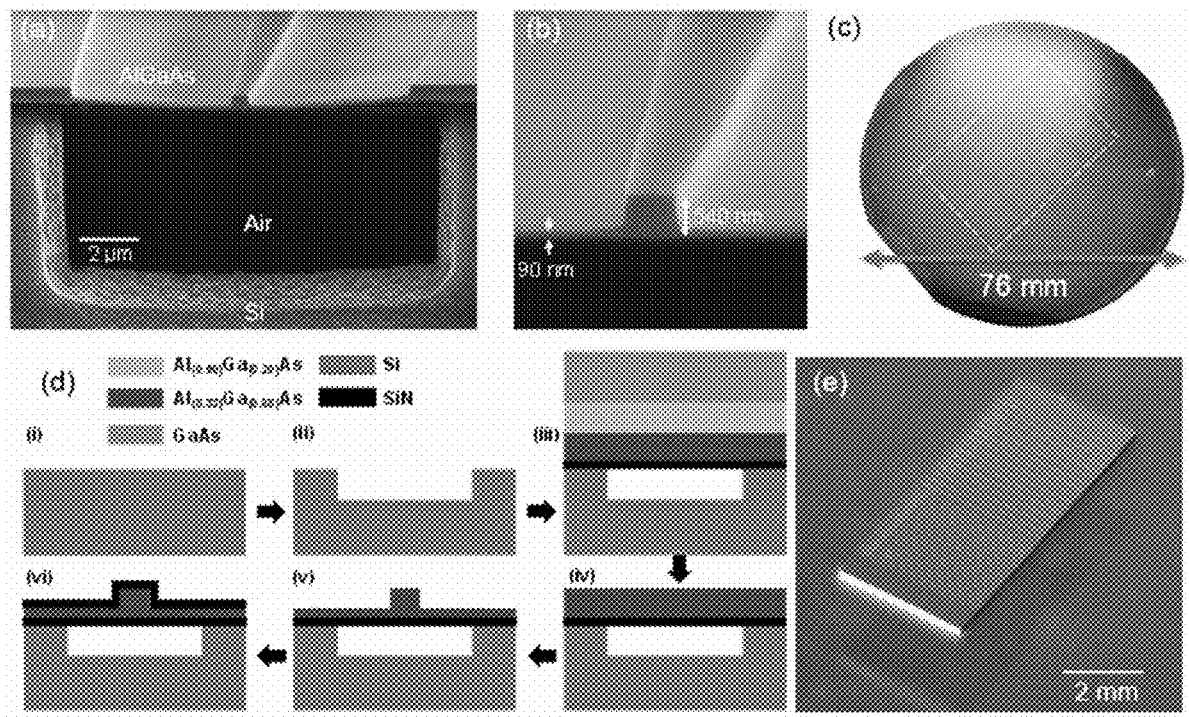
FIG. 9 shows a suspended $Al_xGa_yAs_z$ on silicon platform. (a), (b) SEM images of a waveguide facet produced by dry etching; (c) a processed wafer prior to die release, wherein an $Al_xGa_yAs_z$ film was bonded over the entire surface, and devices were fabricated in a middle dashed portion; (d) fabrication flow for six processing steps; (e) focus-stacked image of a microring resonator die after release from the wafer.

Air-clad mid-IR waveguides include suspended AlGaAs on silicon, which is shown schematically in FIG. 9. We employ direct-bonded membranes, which provide superior mechanical stability and design flexibility thanks to the free choice of geometry and absence of stress-inducing perforations. The issue of surface-oxide losses is addressed by passivating the AlGaAs surfaces with ultrathin films of sputtered silicon nitride (SiN), bringing the loss of waveguides from more than 100 dB/cm (without passivation) to <2.5 dB/cm (after passivation) through most of the mid-IR. The fabrication technique described in this work can also be applied to other III-V materials such as GaAs, GaP and GaN. In the case of GaP and GaN, the larger bandgaps could enable even wider transparency windows. However, due to the relative maturity of its device processing and material growth, we chose AlGaAs as the suspended material here.

A fabrication approach to realize $Al_{0.32}Ga_{0.68}As$ (bandgap of $\lambda$=681) photonic waveguides on a conventional silicon 76 mm-diameter wafer (FIG. 9). Design and characterization of several passive devices include microring resonators, compact waveguide bends, inverted taper edge couplers, and multimode interferometer (MMI) 1×2 splitter junctions. Dispersion-engineered waveguides achieve second-harmonic generation (SHG) and supercontinuum generation from femtosecond laser sources at low pulse energies, and we compare the results for near-IR and mid-IR pumping.

A schematic representation of the fabrication process is provided in FIG. 9(*d*). Fabrication runs were conducted with variations on the main fabrication flow. The illustrated process captures the essential details of the best-performing variation, on which most of the results of this work are focused. The fabrication process can include cleaning a silicon handle wafer; etching trench features where waveguides will be formed; bonding an epitaxial III-V wafer to the handle (a SiN passivation layer has been applied prior to the bond), chemically removing the III-V wafer substrate (GaAs) and etch-stop layer ($Al_{0.8}Ga_{0.2}As$); electron-beam lithography and plasma etching of the ridge waveguide features over the trenched areas, and final oxide stripping and top surface passivating with SiN. Individual dies were released from the wafer simultaneously using deep reactive ion etching (DRIB) through the silicon handle wafer. The dies were then annealed at 300° C. in a nitrogen environment, which reduced losses from N—H bond absorption. The devices have a nominal core thickness of 540 nm and a slab thickness of 90 nm [FIG. 9(*b*)]. The trenches underneath the waveguides are 6 μm deep and about 11 μm wide. The SiN barriers on the bottom and top surfaces of the membrane are 10 and 20 nm thick, respectively. No die-level processing was necessary, enabling parallel fabrication of dozens of chips without any polishing and cleaving, that might be involved with sapphire or group III-V substrates. This is provided as a benefit, of a silicon substrate.

High-performance passive devices are involved for integrating multiple components on one chip, such as nonlinear frequency converters, modulators, and detectors. The ability to simultaneously realize precisely dispersion-engineered waveguides with tight bending radii, small mode volumes, and low coupling losses is not guaranteed in all waveguide platforms. To this end, we designed, fabricated, and tested several key passive elements, including microring resonators, bends, 1×2 MMI power splitters, and input/output (edge) couplers. First, we consider the characterization of suspended AlGaAs microring resonators over a broad wavelength range from the near- to mid-IR. We show that the passivation approach was effective at suppressing the inherently high absorption loss of bare AlGaAs surfaces, achieving losses below 2.5 dB/cm out to $\lambda$=4.6 μm. An analysis focused on specific loss contributions in the mid-IR, including surface states of unpassivated waveguides.

Microring resonators provide a convenient gauge for the waveguiding performance of any integrated photonic platform. Since we are interested in nonlinear applications involving pump wavelengths across the near-IR and mid-IR, we examined the performance of several resonator devices at $\Delta$=1.26, 1.59, 2.39, 3.64, and 4.56 μm. For all wavelengths, light was aligned to the quasi-transverse-electric (TE) mode of the waveguides.

Figure 10:
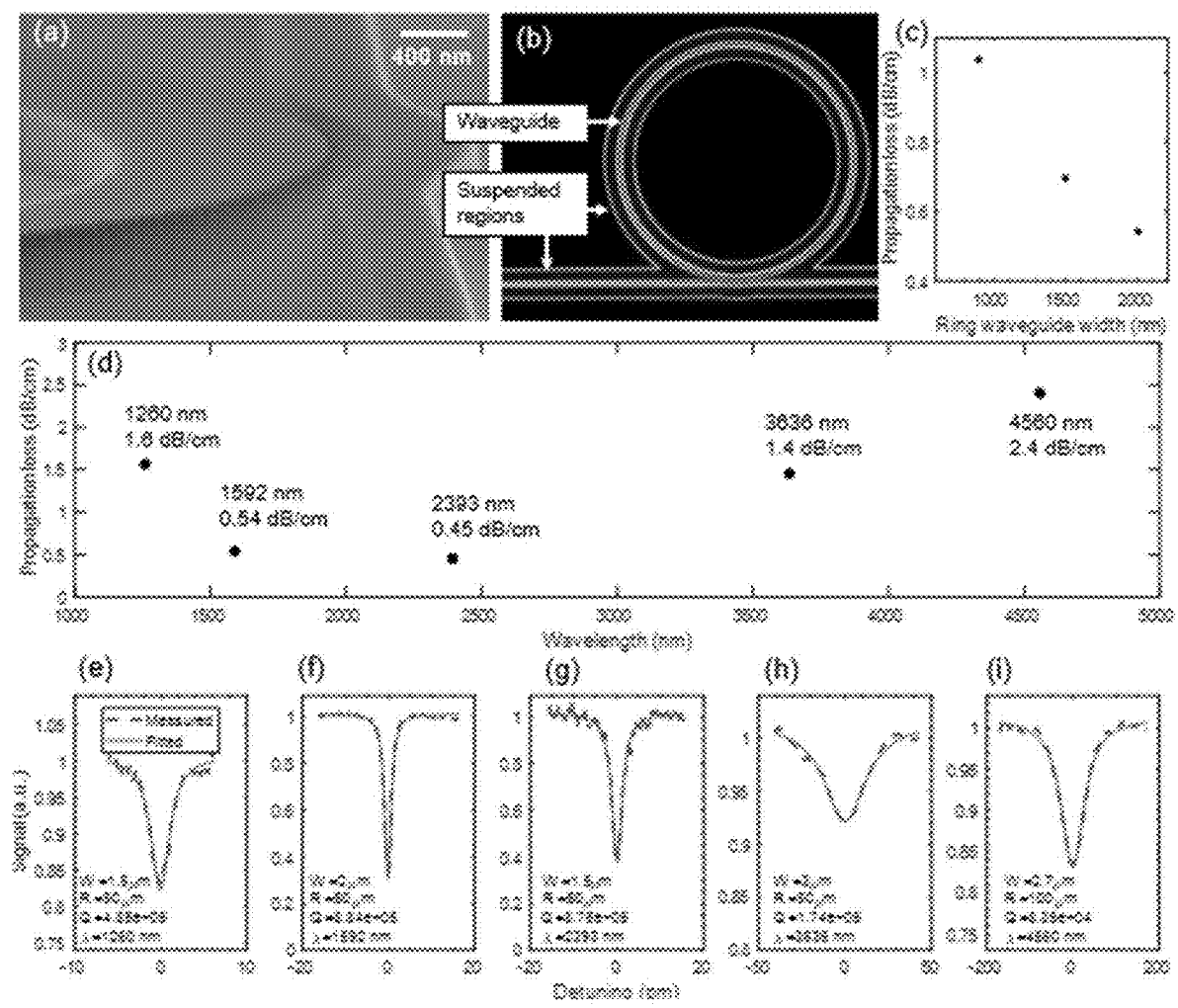
FIG. 10 shows microring resonators. (a) SEM image of a resonator, showing pulley-coupler region and sidewall roughness of a ring; (b) dark-field optical micrograph of the top view of a fabricated resonator. Suspended regions include waveguide features on the substrate. (c) Ring waveguide width versus propagation loss for resonances taken at $\lambda$=1564, 1556, and 1592 nm, from left to right. (d) Compiled propagation loss data versus wavelength. The first two data points (1260 and 1592 nm) use the intrinsic rather than loaded Q. For the others, the signal was AC-coupled. (e)-(i) Experimental and fitted traces for the resonance considered in each datapoint of subplot (d). W, width of ring waveguide; R, radius of ring resonator; Q, loaded quality factor.

The results are collected in FIG. 10. The broadband spectral dependence of propagation loss is shown in FIG. 10(*d*). The relevant device parameters (ring waveguide width, ring radius, etc.) and measurement results are shown for each resonance in FIGS. 10(*e*)-10(*i*) The resonances in this figure each represent the highest quality factor (QQ) observed for that wavelength point. The maximum loaded Q of $8.8 \times 10^5$ is achieved in the 2-μm-wide ting device at $\lambda$=1592 nm. Factoring out the coupling loss of the ring (conservatively assuming an under-coupled condition), this corresponds to an intrinsic Q of $1.1 \times 10^5$, giving a waveguide propagation loss of 0.54 dB/cm. Going to longer wavelengths, we measured propagation losses of 0.45, 1.4, and 2.4 dB/cm for $\lambda$=2.39, 3.64, and 4.56 μm, respectively. It can be seen that the propagation loss exhibits a trough between $\lambda$=1500-2500 nm, with a sharply rising loss on the short-wavelength side and a slow increase toward longer wavelengths. The blue-side increase can readily be attributed to the well-known phenomenon of surface-state absorption observed in GaAs/AlGaAs waveguides, which increases sharply at wavelengths near $\lambda$=1 μm. The fabrication process was not optimized to enhance the performance in this region, but specific treatments are possible if low-loss operation is here. The loss observed from $\lambda$=1500-2500 nm is mostly scattering loss. The trend of ring waveguide width versus loss is plotted in FIG. 10(*c*). It can be seen that the propagation loss does not bottom out even at the widest width considered, showing that sidewall scattering is still a significant contribution to the overall loss. FIG. 10(a) shows evidence of sidewall corrugations resulting from roughness in the lithography that is transferred directly to the device, indicated by striations that are uniform along the vertical axis, but varying in position in the width axis of the waveguide. Multipass electron-beam lithography or resist reflow can be employed to mitigate this effect. Ring resonance data were taken more than two months after fabrication of the chips, proving the effectiveness of the passivation layer at preventing losses from oxidation over time.

Figure 11:
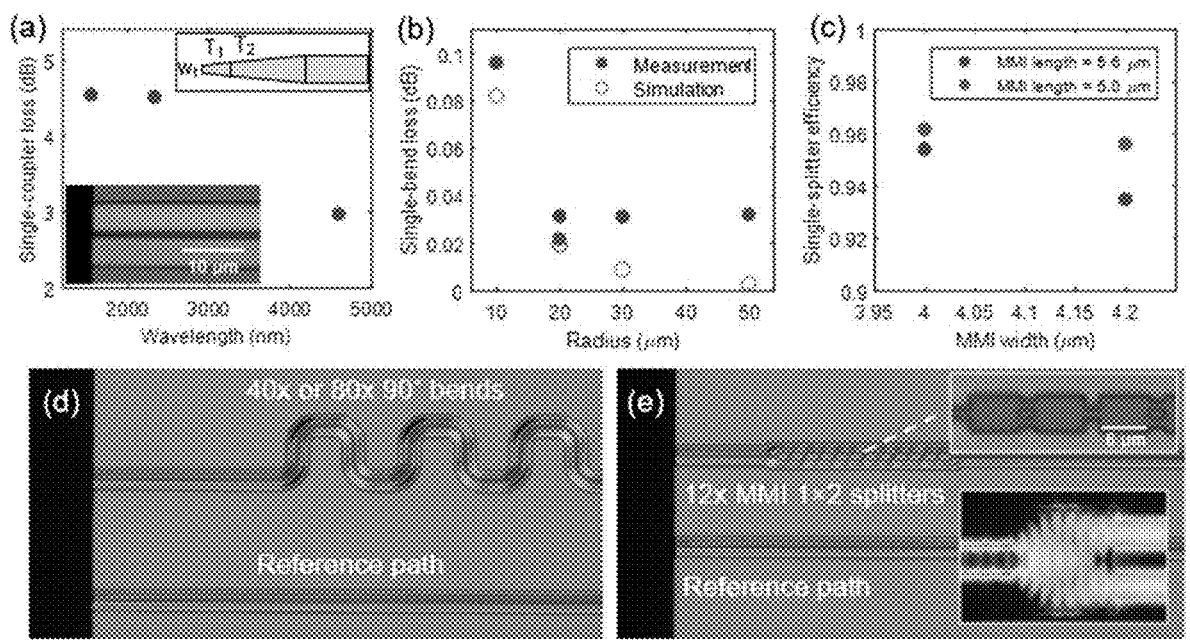
FIG. 11 shows characterization of passive suspended $Al_xGa_yAs_z$ features. (a) Loss-per-edge-coupler at different wavelengths. Top inset, inverted taper geometry, showing tip width wt and taper sections; bottom inset, optical micrograph of an inverted taper edge coupler; (b) bend radius versus single-bend loss at $\lambda$=4.6 µm for a 1.4 µm-wide waveguide; (c) measured MMI power splitter efficiency for several variations on the length and width of the multimode propagation section; (d), (e) optical micrographs of cutback structures used to measure single-bend and single-splitter loss, respectively. Top inset of (e): zoom view of consecutive MMIs. Bottom inset of (e): top view of the simulated optical intensity of the designed MMI splitter.

In order to achieve efficient frequency conversion with integrated photonic devices, it is critical to have low-loss and broadband, on- and off-chip couplers. We pursued inverted taper couplers to meet these goals. The facets are prepared in parallel via plasma etching. An optical micrograph of a typical edge coupler is shown in the lower inset of FIG. 11(a). They employ two stages of tapering [upper inset of FIG. 11(a)], which reduces the total length. We consider several couplers with corresponding wavelengths of interest to this project: 1.55, 2.3, and 4.6 µm. The results are shown in FIG. 11(a). In many cases, the taper length did not factor significantly into the performance, but it is included for completeness. The lowest coupling loss of 3.0±0.1 dB is achieved at λ=4.6 µm, where this value corrects for the expected propagation loss of 0.2 dB in a 1 mm long chip at this wavelength. The contribution of surface reflection to the loss of this taper tip was estimated to be 1.2%. Experimental losses are reported with respect to the reference transmission of light through both aspheric lenses with no chip. The increase in loss toward shorter wavelengths is expected due to the slab portion constraining the modal extent in the vertical direction. Fully suspended taper geometries may be employed in the future to enhance the performance at shorter wavelengths.

Waveguide bends can be included in an integrated photonic system, but some material platforms intrinsically affect bending performance based on tire lateral or horizontal index contrast, or the typical mode volume required to realize low-loss waveguides. For waveguides that take advantage of strong modal confinement to avoid, cladding losses, relatively large, graded-curvature bends are required to avoid modal mixing. In other platforms where limited index contrast is available, bends are also constrained by leakage losses. With suspended AlGaAs on silicon, however, a strong index contrast can be achieved on all sides of the waveguide, enabling small mode volumes and compact bends. We utilized the structures shown in FIG. 11(d) to test the bending performance. They consist of a reference path with only a straight waveguide, and an adjacent path containing 40 or 80 90° bends, each separated by 10 am of straight waveguide length, to properly assess the mode transition loss (each bend having two straight-to-bend transitions). Propagation losses are also part of the total loss. These structures were repeated over an array of several widths and radii and tested at both λ=3.4 and 4.6 µm. The bend loss dependence on radius at λ=4.6 µm is shown in FIG. 11(b), with a typical value of 0.03 dB loss per bend above radii of 20 µm. The waveguide width was 1.4 µm. The experimental values are plotted alongside simulated bend loss values, where one bend in simulations consists of two transitions between straight and bent waveguides. The results are generally in good agreement, and the discrepancy in loss values for larger radii can be explained by additional propagation loss compared to the reference paths. At λ=3.4 µm, 0.03 dB loss per bend is experimentally observed for a radius of 20 µm (1.4 µm waveguide width), and 0.06 dB loss per bend at 10 µm radius (1.0 µm waveguide width). For reference, the simulated loss of one 10 µm radius bend at λ=3.4 µm (two transitions from straight-to-bent or vice versa) is 0.04 dB, in good agreement, considering the extra loss is likely from sidewall scattering.

We also investigated 1×2 power splitters, another important building block for multifunctional photonic systems in the mid-IR and LWIR regions. We used MMI-type splitters for compactness, as opposed to adiabatic or directional coupler-based designs. The simulated design used the following parameters: MMI length of 6 pan, MMI width of 4 µm, port waveguide width of 1 µm, and output port waveguide center-to-center gap of 2 µm. The simulated efficiency was 90% at λ=3.4 µm. The optical intensity from a top view is shown in the lower inset of FIG. 11(e). This device is simulated to maintain better than 90% efficiency (0.46 dB loss) over an optical bandwidth of 3000-3400 nm. We characterized the devices with the structures in FIG. 11(e). They consist of a reference path with only a straight waveguide, and an adjacent path containing 12 consecutive 1×2 or 2×1 devices. Comparing their transmission at λ=3.4 µm, we observed an experimental device efficiency of 96±1%. We also tested several variations in design dimensions, and the overall performance in FIG. 11(c) was robust to variations of several hundred nanometers in the MMI length and width parameters. The difference in performance between the simulated and experimental results could be partly a result of unexpected deviations from the design (such as rounded features from lithography and etching) and partly from error in the reference path normalization.

Figure 12:
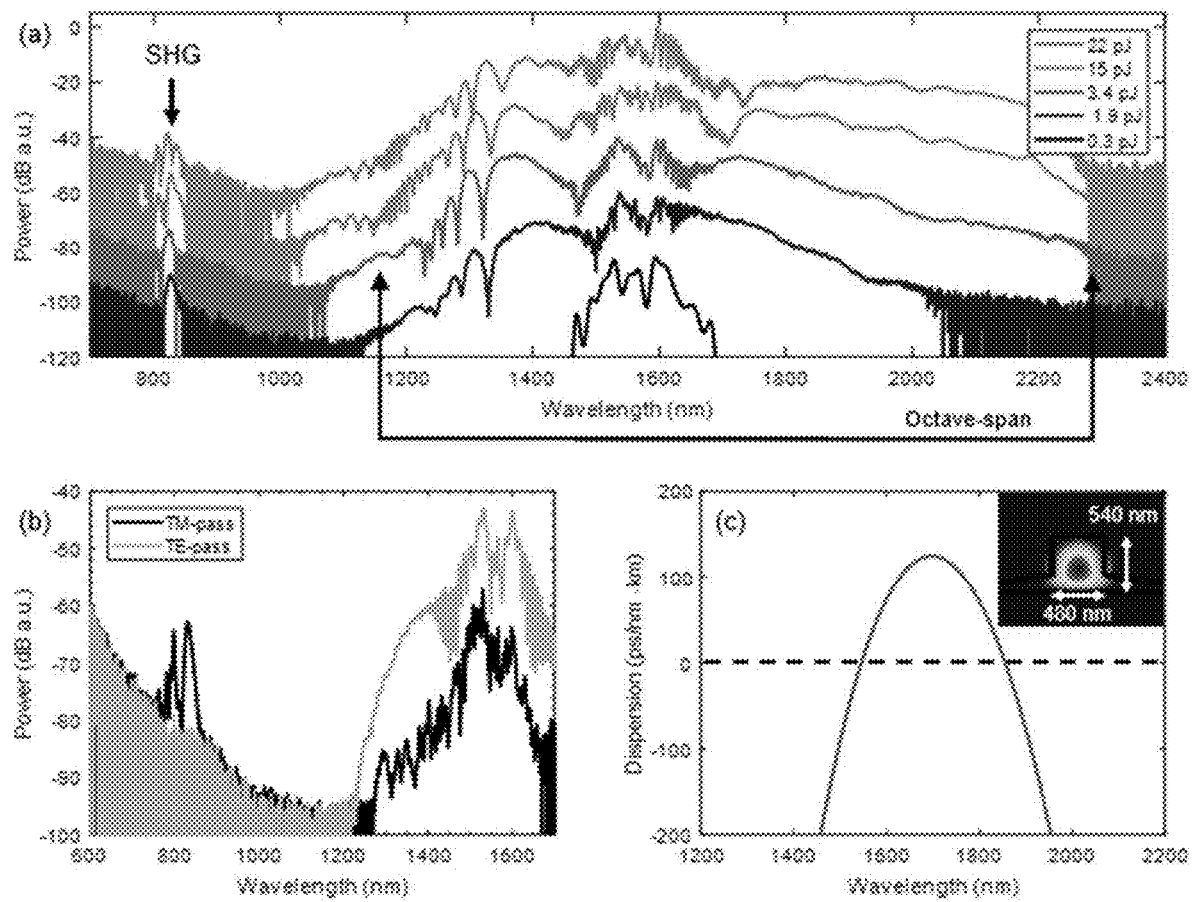
FIG. 12 shows supercontinuum generation from a 1560 nm pump. (a) Measured spectra for different waveguide-coupled pulse energies. Octave-spanning bandwidth is highlighted for the case of 3.4 pJ. Trace-to-trace offset is 20 dB. (b) Polarized supercontinuum output of a similar waveguide for the TE- and TM-pass cases, showing suppression of the second-harmonic peak for TE pass; (c) simulated waveguide GVD; inset, intensity profile for the mode under consideration.

Consider suspended AlGaAs waveguides that are dispersion-engineered to achieve anomalous group velocity dispersion (GVD) near the pump wavelength of 1560 nm [FIG. 12(c)]. The waveguides have a core width of 480 nm (estimated based on scanning electron microscopes SEMs and then increasing the estimated width slightly to obtain anomalous dispersion in simulations), an effective mode area of 0.22 µm$^2$, and a length of 4 mm. Due to a slight curvature of the etch profile near the waveguide core [FIG. 9(b)], the mode simulations incorporate a sloped region on the sidewalls, as shown in the inset of FIG. 12(c). The pump is an amplified and compressed erbium fiber oscillator with a repetition rate of 160 MHz, a pulse width of 61 fs, and a center wavelength of 1560 nm. Light was coupled into the chip through an aspheric lens, and out through a single-mode lensed fiber. FIG. 12(a) shows the output spectral evolution as the waveguide-coupled pump pulse energy is varied. At 300 fj pump pulse energy, the waveguide output spectrum exhibited no noticeable broadening compared to the input comb spectrum. The onset of supercontinuum generation was observed near 1.9 pJ, and the spectrum was noticeably saturated by three-photon absorption (3 PA) at 15 pJ. We observed octave-spanning supercontinuum generation (at −45 dB level with respect to pump intensity) at a pulse energy of 3.4 pJ (average waveguide-coupled power of 0.5 mW). We also observed a SHGpeak near 830 nm for almost all input, power levels. This results from phase-mismatched conversion over short lengths on the chip and has been observed in other waveguide platforms possessing nonzero $\chi^{(2)}$. We confirmed this by polarizing the output spectrum in vertical (TM) or horizontal (TE) directions in FIG. 12(b). The peak was (TM)-polarized. This polarization relationship (TE pump, TM harmonic) is expected for GaAs or AlGaAs waveguides propagating along the [0$\bar{1}\bar{1}$] axis. The low pulse energies required to initiate soliton fission in these waveguides and the simultaneous production of single-spatial-mode supercontinuum and SHG could benefit numerous applications, including frequency combs that could be self-referenced with no amplifiers following the oscillator, or very high repetition-rate systems. Significantly stronger SHG can readily be achieved in the future through the use of quasi-phase-matching. The short-wavelength supercontinuum could, also be enhanced via treatments to reduce the short-wavelength losses from surface states on the AlGaAs membrane, which we assume to be the current, limitation to the bandwidth.

Figure 13:
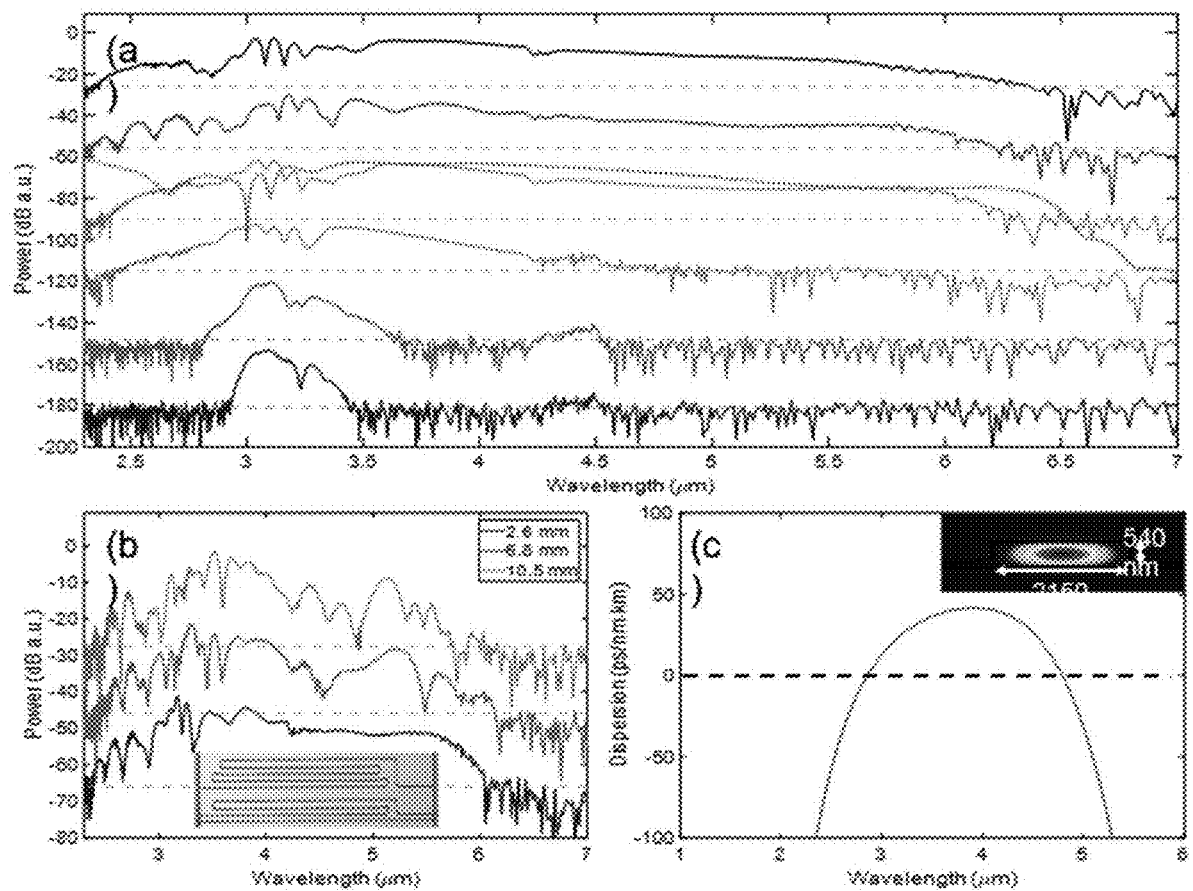
FIG. 13 shows (a) supercontinuum generation from a 3060 nm pump; experimentally measured spectra for different waveguide-coupled pulse energies (solid lines), and simulated spectrum at 45 pJ waveguide-coupled pulse energy (dotted line); trace-to-trace offset, 30 dB; (b) supercontinuum output for various total waveguide lengths at 67 pJ pulse energy; trace-to-trace offset, 20 dB; inset, optical micrograph of a paper-clip structure used for length variations. Dashed gray lines in (a, b) indicate approximate noise floor for each trace. (c) Simulated waveguide GVD; inset, intensity profile for the mode under consideration.

Consider broadening of pulsed, lasers in the mid-IR region. Here, the pump was produced via difference frequency generation of an amplified and broadened erbium fiber comb output. The nominal pulse width was 85 fs, the repetition rate was 100 MHz, and the center wavelength was 3.06 μm. We focused on a waveguide geometry with a core width of 2.15 μm, an effective mode area of 1.2 μm$^2$, and a nominal length of 2.3 mm, excluding tapered regions. The GVD and intensity mode profile are depicted in FIG. 13(c), showing a much flatter and broader region of anomalous dispersion compared to the 1550 nm case (owing to the strongly reduced bulk GVD contribution in the raid-IR for AlGaAs). The waveguides were measured by coupling the pump light in the TE-mode orientation and analyzing the output spectrum in a Fourier-transform infrared spectrometer (FTIR). The light was coupled out through an aspheric lens aligned to collimate the long-wave side of the spectrum. FIG. 13(a) shows the measured spectra at different waveguide-coupled pump pulse energies. At the lowest energy of 11 pJ, the pump exhibited no significant broadening. Supercontinuum generation occurred at 45 pJ, showing a smooth, mostly unstructured spectrum spanning out to 6200 nm with a small dispersive wave peak near 6000 nm. At higher pump powers, the spectrum flattened out and broadened slightly. We also investigated variations on the waveguide length in FIG. 13(b). A fixed waveguide-coupled pulse energy of 67 pJ was used here. As expected, longer waveguides resulted in the generation of more solitons, giving a more structured spectrum as the pulse progressed to a final length of 10.5 mm.

Returning to FIG. 13(a), compare the experimental versus simulated results for 45 pJ of waveguide-coupled pulse energy. The simulations use an n$^{(2)}$ of $0.9 \times 10^{-17}$ m$^2$/W and a uniform propagation loss of 10 dB/cm. This loss can be confined to a narrow peak near λ=3 μm from N—H bond absorption. The material dispersion was modeled as n(λ,x) =n$_{GaAs}$(λ)–0.45x for λ>1.1 μm, where n$_{GaAs}$ is the material dispersion of GaAs, and xx is the mole fraction of aluminum for a given AlGaAs composition. The structure of the simulated spectrum largely agrees with the experiment. The simulation produces a dispersive wave near λ=6 μm with a smooth region connecting it to the pump. However, the short-wavelength end of the spectrum has some dissimilar features, such as the absence of a simulated dispersive wave at λ=2.2 μm. The location of the dispersive wave is strongly dependent on the zero crossing in the GVD curve, so even a small deviation in the geometry or material dispersion could result in significant changes to the spectrum. This could be resolved with more precise measurements of the AlGaAs core thickness, as well as direct measurements of the refractive index of this particular AlGaAs composition in the mid-IR using spectroscopic ellipsometry.

Larger broadening in the long-wave spectrum can occur for waveguides with modified dispersion profiles, such as deeper etches or slightly thicker core regions, which should increase the bandwidth of the anomalous dispersion region. For example, increasing the core thickness of the waveguide by only 20 nm extends the anomalous GVD region to 2.7-5.1 μm instead of 2.9-4.8 μm, producing a redshift by almost 600 nm in the long-wave dispersive wave. The thickness in this work was chosen as a compromise enabling broadband anomalous dispersion to be engineered from λ=1.5 to 4.8 μm, depending on the waveguide width. SHG was not observed for 3060 nm pumping, most likely due to the increased mode area.

The integrated photonic article included suspended AlGaAs waveguides on silicon. By using directly bonded AlGaAs membranes on pre-etched trenches in a silicon substrate, we have overcome many obstacles to the adoption of III-V materials for integrated photonics in the mid-IR. With this approach, multifunctional devices leveraging $\chi^{(2)}$ and $\chi^{(3)}$ nonlinearities can be fabricated reliably at the wafer-scale with high coupling efficiency and low propagation losses. We show the all-around strengths of this platform through a series of linear and nonlinear experiments. The relatively wide bandgap of this AlGaAs composition has enabled us to use near-IR pumps to achieve SHG and octave-spanning supercontinuum generation in dispersion-engineered AlGaAs waveguides at remarkably low waveguide-coupled pulse energies of 3.4 pJ. We also realized octave-spanning supercontinuum generation in the mid-IR, from λ=2.3-6.5 μm. High-quality microring resonators were fabricated, and a loss of 0.45 dB/cm was realized at a wavelength of 2.4 μm. A minimum coupling loss of 3.0±0.1 dB/facet was observed at λ=4.6 μm. Low-loss passive elements, including compact waveguide bends (0.06 dB loss per 90° bend with 10 μm radius) and 1×2 MMI power splitter junctions with only 6 μm total length and 96±1% power efficiency have also been demonstrated in the mid-IR. Crucial to the practical development of this platform, we characterized the performance of unpassivated AlGaAs waveguides and showed that proper passivation is essential to low-loss operation in the mid-IR. We developed SiN passivation, allowing waveguides to be operated in air for long time periods (most loss values were measured >2 months after fabrication). All of this has been achieved at the wafer-scale with no required die-level processing, a valuable practical advantage over native III-V platforms. The combination of a wide optical transparency window, strong $\chi^{(2)}$ and $\chi^{(3)}$ nonlinearities, and the bandgap of 681 nm may enable ultra-efficient frequency converters bridging the gap from the near-IR to the mid-IR. Furthermore, the observed ultralow thresholds for optical nonlinearities, combined with the low propagation losses realized in this work, may point to new opportunities for on-chip quantum photonics at 1550 nm and beyond. Suspended AlGaAs on silicon is a high-performance platform for multifunctional integrated photonics with both passive and nonlinear systems.

Example 2

Nonlinear frequency conversion plays a role in advancing the functionality of next-generation optical systems. Portable metrology references and quantum networks will demand highly efficient second-order nonlinear devices, and the intense nonlinear interactions of nanophotonic waveguides can be leveraged to meet, these requirements. This Example describes second harmonic generation (SHG) in GaAs-on-insulator waveguides with unprecedented efficiency of 40 W$^{-1}$ for a single-pass device. This result is achieved by minimizing the propagation loss and optimizing phase-matching. Surface-state absorption and design the waveguide geometry for modal phase-matching with tolerance to fabrication variation occurred. A 2.0 μm pump is converted to a 1.0 μm signal in a length of 2.9 mm with a wide signal bandwidth of 148 GHz. Tunable and efficient operation is demonstrated over a temperature range of 45° C. with a slope of 0.24 nm/° C. Wafer-bonding between GaAs and SiO$_2$ is optimized to minimize waveguide loss, and the devices are fabricated on 76 mm wafers with high uniformity. This device fully integrated self-referenced frequency combs and high-rate entangled photon pair generation.

Optical frequency conversion uses nonlinear interactions of light with matter to generate new wavelengths of light. Recent efforts have improved conversion efficiencies and broadened the application of this technology by using nanophotonic waveguides. Second harmonic generation (SHG) is one nonlinear process of significant interest because it is critical for stabilizing optical frequency combs. In SHG, input pump light is converted to a signal with twice the frequency. It is used to self-reference a frequency comb by comparing and controlling the difference between two sections of the comb spectra that are separated by an octave. This is referred to as f-2f self-referencing, and it produces low-noise optical frequency combs used for optical clocks, optical frequency synthesizers, low-phase-noise microwave generation, and molecular sensing.

Increasing the application space for stabilized frequency combs can involve reducing cost, size, weight, or power consumption while maintaining performance metrics. Chip-scale integration is an attractive way to achieve these goals, particularly using heterogeneous integration to combine a suite of different materials into a compact package. A promising approach to develop a chip-scale stabilized frequency comb is to pump a SiN microresonator with, a continuous-wave (CW) near-IR laser. This design is scalable to large-volume and high-yield manufacturing to reduce cost. However, exceptionally high nonlinear conversion efficiencies are required for this fully integrated system. In particular, avoiding the use of amplifiers for the microresonator pump laser and the SHG pump light will be a significant advancement. Given the limitations presented by the SiN microresonator quality factor that restricts the pump power and by the detector noise, extremely high SHG efficiency is necessary to achieve a sufficient signal-to-noise ratio.

Figure 14:
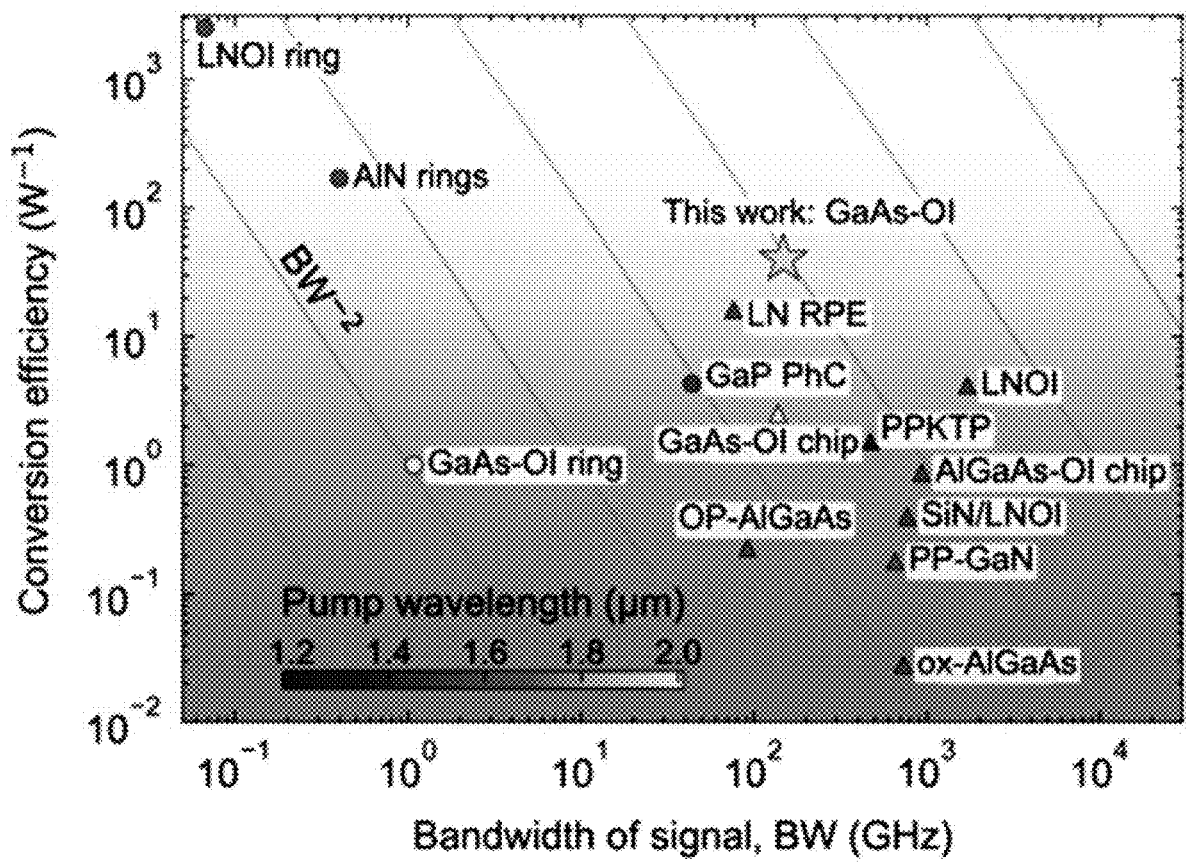
FIG. 14 shows highest SHG conversion efficiencies demonstrated from different waveguide material platforms for resonant (circles) and single-pass (triangles) devices. The signal bandwidth is defined by the FWHM. References: AlGaAs-OI chip, AlN rings, GaAs-OI chip, GaAs-OI ring, GaP PhC, LNOI, LNOI ring, LN RPE, OP-AlGaAs, ox-AlGaAs, PP-GaN, PPKTP, SiN/LNOI.

A comparison of the highest SHG conversion efficiencies with the corresponding signal bandwidth from different waveguide platforms is shown in FIG. 14 for the non-depleted pump regime. The pump wavelength is also indicated since the conversion efficiency is generally higher for shorter wavelengths with a given platform. Neglecting the effects of non-uniformity and loss, conversion efficiency is expected to increase inversely proportional to the square of the bandwidth. Larger SHG bandwidths are especially important for applications where the pump is either broad or consists of multiple narrow-linewidth modes that reside within the SHG bandwidth. In certain cases, one narrow-linewidth pump mode is relevant so larger SHG bandwidths may not be helpful as long as the pump mode can be aligned to the SHG conversion band. Another aspect to consider in this comparison is that SHG is most applicable as a component of a system. Therefore, relevant SHG technologies should either support versatile and low-loss coupling techniques or be compatible with heterogeneous integration. For example, to add SHG functionality to photonic integrated circuit (PIC) based on mature and sealable Si photonics, it is advantageous to either deposit, grow, or bond the nonlinear material to the Si substrate.

Integrated f-2f self-referencing without an optical amplifier or an assist-laser requires an SHG conversion efficiency on the order of 40 W$^{-1}$. At this level, 5 µW of CW pump light (the typical power from a single comb line) can be converted to 1 nW of signal light. To our knowledge, no single pass device has previously demonstrated this. While some resonant devices have exceeded this efficiency, the narrow bandwidth and sensitive phase-matching condition makes them impractical for a fully integrated f-2f self-referencing system. These resonant devices are better suited for parametric down-conversion applications with narrow bandwidths and squeezed light generation. Furthermore, producing such systems on a large scale requires a high-yield and reproducible fabrication. An SHG device herein has high efficiency and bandwidth for an integrated f-2f self-referenced comb. The high second-order nonlinearity of GaAs paired with the high index contrast and uniformity of integrating GaAs-based waveguides on Si has enabled this advancement. The device permits birefringent modal phase-matching in a GaAs waveguide to produce SHG from a 2.0 pump with an efficiency of 40 W$^{-1}$ and a signal bandwidth of 0.5 nm. The device is fabricated at the 76 mm (3-inch) wafer scale and is compatible with integration on the SiN platform used for the f-2f self-referencing.

Efficient SHG conversion with modal phase-matching is provided by the self-referencing nonlinear frequency converting photonic waveguide described here that can be made from processing techniques for wafer-scale fabrication. The conversion efficiency is characterized to determine the peak efficiency, bandwidth, and temperature dependence.

To design the SHG waveguide, select a phase-matched geometry that maximizes the conversion efficiency, η, defined as:

$$\eta = \frac{P_{2\omega}(L)}{P_\omega^2(0)} = \frac{2\omega^2 \xi \kappa L^2}{n_\omega^2 n_{2\omega} \epsilon_0 c^3}, \tag{1}$$

wherein $P_{2\omega}$ is the signal power, $P_\omega$ is the pump power, L is the waveguide length, ω is the angular frequency of the pump, ϵ0 is the permittivity of free space, and c is the speed of light in vacuum. The effective refractive indices of the pump and signal optical modes are $n_\omega$ and $n_{2\omega}$, respectively. The ξ term in Eq. (1) accounts for phase-matching and the propagation loss: Note that in a typographical error exists: in Eq. (3), the α appearing in the cosine term should be replaced with Δ.

$$\xi = \frac{A^2 + B^2}{(\Delta\alpha^2 + \Delta\beta^2)(L/2)^2} e^{-(\alpha_{2\omega}/2 + \alpha_\omega)L}, \tag{2a}$$

wherein $$A = \sin h(\Delta\alpha L/2)\cos(\Delta\beta L/2), \tag{2b}$$

$$B = \cos h(\Delta\alpha L/2)\sin(\Delta\beta L/2). \tag{2c}$$

Parameters $\alpha_\omega$ and $\alpha_{2\omega}$ are the propagation loss coefficients for the pump and signal. The phase-mismatch, Δβ, and the loss-mismatch, Δα, are defined as $\Delta\beta = \beta_{2\omega} - 2\beta_\omega = (2\omega/c)(n_{2\omega} - n_\omega)$ and $\Delta\alpha = \alpha_{2\omega}/2 - \alpha_\omega$. A nonlinear coupling parameter, κ, in Eq. (1) accounts for two effects: the mode overlap between the pump and signal light and the interaction between the optical modes and the nonlinear optical susceptibility of the waveguide. It is defined as:

$$\kappa = \frac{\left|\iint_{\mathbb{R}^2} d_x E_{x,\omega}^2 E_{y,2\omega} dx dy\right|^2}{\left(\iint_{\mathbb{R}^2} |E_{x,\omega}|^2 dx dy\right)^2 \iint_{\mathbb{R}^2} |E_{y,2\omega}|^2 dx dy}, \tag{3}$$

wherein dx is the spatially varying effective second-order nonlinear coefficient corresponding to components of the rid tensor that interact with xx-polarized pump light. The xx-polarized component of the pump mode is Ex,ω, and the y-polarized component of the signal mode is Ey,2ω. Wave propagation is in the z-direction and the waveguide top-surface in the y-direction. Each integral in Eq. (3) is taken over all space in the x-y plane.

Figure 15:
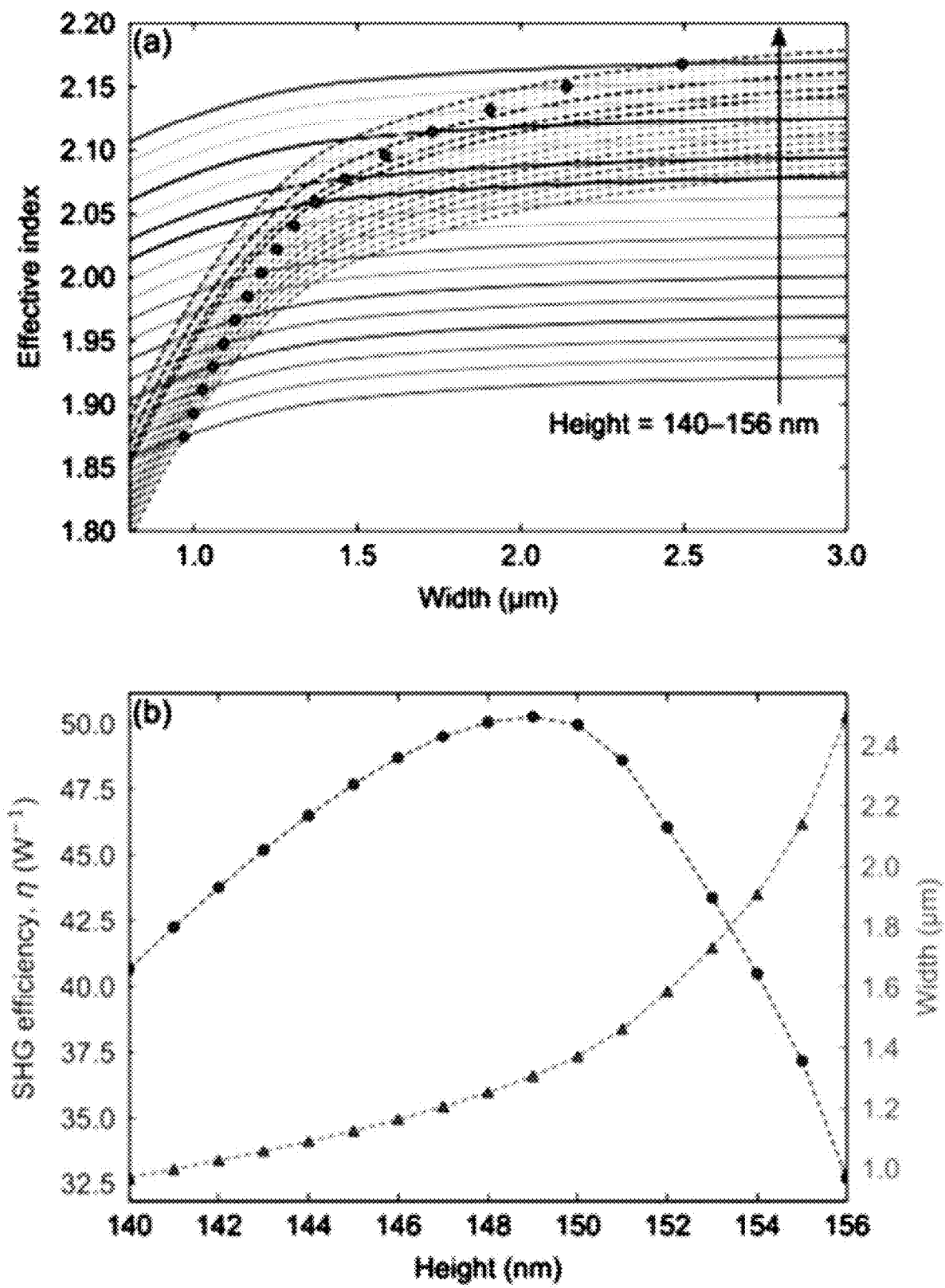
FIG. 15 shows (a) effective indices of the signal (solid lines) and pump (dashed lines) as a function of waveguide width. Each curve represents a different waveguide height, from 140 nm with the lowest indices to 156 nm with the highest indices, in steps of 2 nm between curves. (b) SHG conversion efficiency ($\eta$) for a length of 2.9 mm plotted in circles on the left axis as a function of waveguide height for the perfectly phase-matched widths plotted in triangles on the right axis.

The magnitude of the $d_{14}$ and $d_{36}$ nonlinear coefficients of GaAs are equivalent for a (100) oriented top surface with wave propagation in the plane of the ($0\bar{1}\bar{1}$) primary flat or the ($0\bar{1}1$) secondary flat. However, there is a wide range of reported values for this coefficient, and these values have large uncertainties because of the measurement techniques and differences in material preparations. For the calculation in this work, we use $d_x$=180 pm/V for GaAs to approximately match our measurements, and the value is neglected in $SiO_2$ and air. Guided optical modes are calculated using a finite-difference method eigenmode solver from which κ is evaluated by Eq. (3). The GaAs is partially etched so a 15 nm thick slab remains, and it is cladded with $SiO_2$ on bottom and air on top. The effective refractive indices, $n_ω$ and $n_{2ω}$, and the nonlinear coupling, κ, are calculated for different heights and widths of the waveguide core. A Sellmeier model is used for the index of each material. The phase-matched geometries are found from the intersection of the discretely calculated values for $n_ω$ of the transverse-electric (TE) polarized pump and $n_{2ω}$ of the transverse-magnetic (TM) polarized signal. Similarly, κ is found by interpolation. FIG. 15(a) shows the effective indices of the pump and signal light for a range of heights and widths, and FIG. 15(b) shows the conversion efficiency η for a length of 2.9 mm (the length used in this experiment) with the corresponding phase-matched geometries. The peak simulated conversion efficiency is 50.3 $W^{-1}$ which occurs at a GaAs thickness of 149 nm and a width of 1.3. The pump and signal propagation losses used in this simulation are 1.5 dB/cm and 16.8 dB/cm, respectively.

Figure 16:
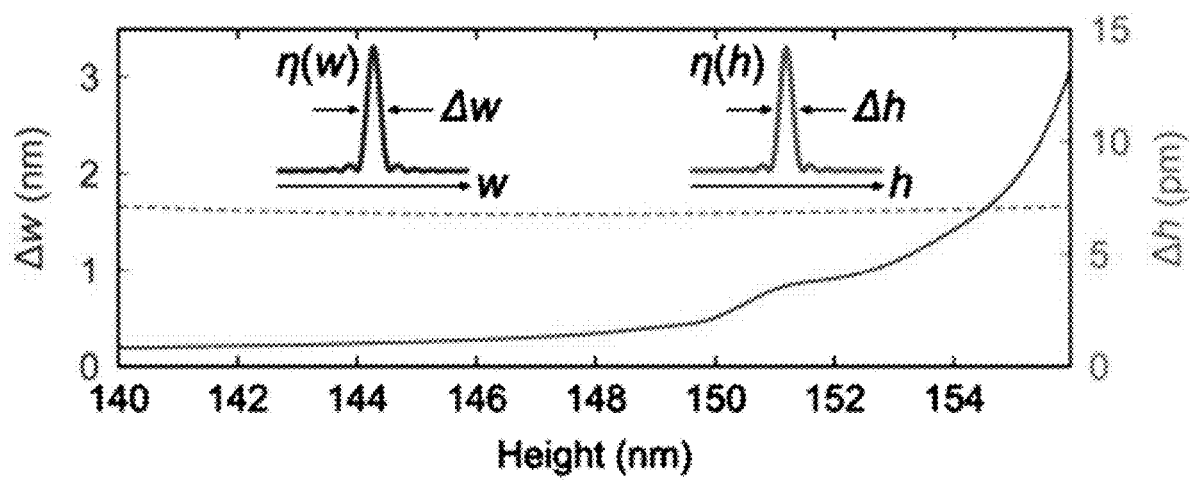
FIG. 16 shows FWHM of the conversion efficiency ($\eta$) for variations in the width ($\Delta w$) shown in solid blue on the left axis and the height ($\Delta h$) shown in dashed orange on the right axis.

Phase error between the pump and signal light due to width and height variations of the waveguide degrade the signal and typically limit the conversion efficiency of waveguided SHG devices. This effect is analyzed using the effective indices in FIG. 15(a). The FWHM bandwidths of the SHG signal are calculated for variations with waveguide width (Δw) and height (Δh), which are plotted in FIG. 16 for a length of 2.9 mm. For larger heights, Δw increases, indicating greater tolerance to width variations. However, the trend for Δh is relatively constant for this range of waveguide heights. Although the peak conversion efficiency may be lower, an SHG waveguide with a height greater than 149 nm is less sensitive to geometric variations. For longer waveguides, these phase errors accumulate and the conversion efficiency becomes more sensitive to geometric variations. Our design targets a thickness of 154 nm for the SHG experiment, which has a phase-matched width of 1.9 and a maximum possible conversion efficiency 40.5 $W^{-1}$ as shown in FIG. 15(b).

The input, facet waveguide width is 490 nm to minimize the coupling loss of the pump mode from a tensed fiber, which is simulated to be 3.6 dB. This waveguide tapers to the SHG waveguide width over a length of 100. At the output facet the waveguide width is the same as the SHG section. The wide waveguide at the output reduces the facet coupling uncertainty compared to a tapered waveguide and the input facet taper is sufficient to suppress unwanted internal reflections. The simulated efficiency for the output coupling of the signal mode is 7.7 dB, however, even higher loss is expected because this calculation does not account for higher-order mode coupling in the output fiber.

While GaAs and AlGaAs are ideal materials for SHG because of their large second-order nonlinearity, two factors limit their performance and application space. First, the bandgap of GaAs limits the SHG signal wavelength to >900 nm. For AlGaAs, shorter wavelengths down to ~600 nm can be achieved depending on the Al mole fraction. The second limiting factor is the surface defect-state absorption. Specifically, As—As bonds formed at the surface create a strong absorption feature with a peak near 950 nm. For GaAs, this absorption feature limits the minimum signal wavelength to ~950 nm. Because of the larger refractive index, GaAs supports higher confinement and smaller modes compared to AlGaAs compounds. Therefore, we use GaAs since its bandgap is compatible with our application to convert ~2.0 light to ~1.0.

Figure 17:
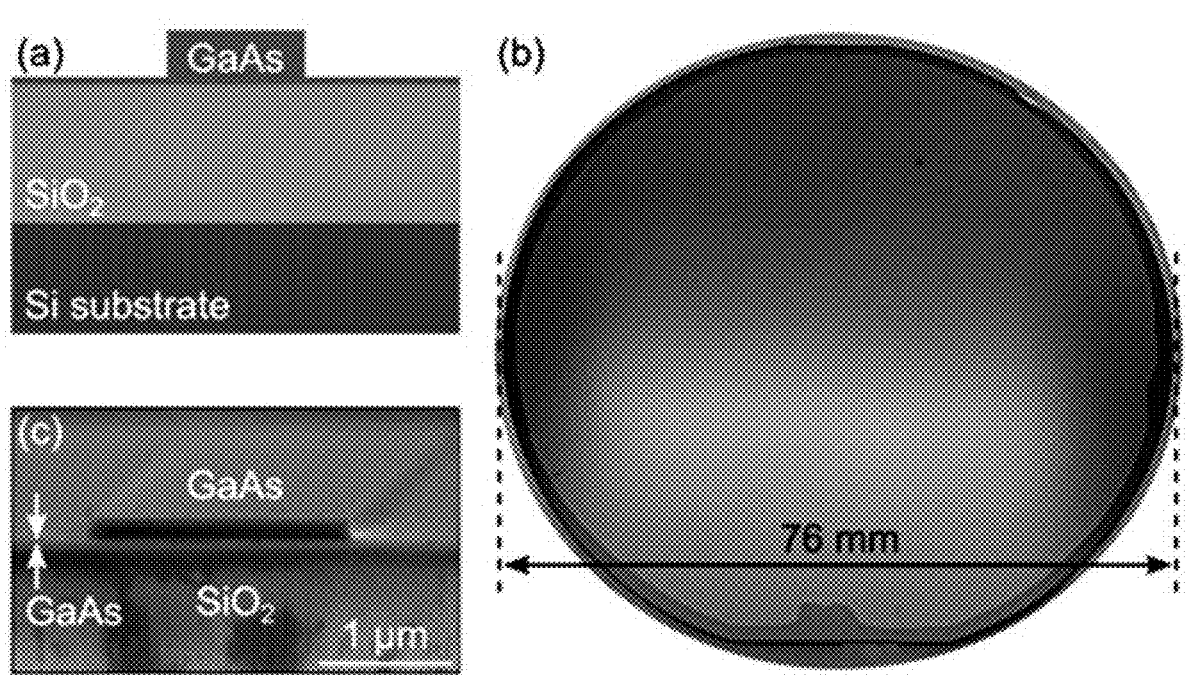
FIG. 17 shows (a) schematic diagram of the waveguide cross-section. (b) Picture of the 76 mm wafer shows nearly perfect yield of the transferred GaAs film. (c) SEM showing the output waveguide facet.

FIG. 17(a) shows a schematic of the designed waveguide cross-section. The fabrication process begins with molecular beam epitaxial growth on the (100) surface of a GaAs wafer. A 150 nm thick $Al_{0.8}Ga_{0.2}As$ etch-stop layer is grown first, followed by the 158 nm thick GaAs waveguide layer. The waveguide layer is 4 nm thicker than is intended for the fabricated waveguide to account for material loss in subsequent HCl and $NH_4OH$ steps. This GaAs wafer is then bonded to a Si wafer with a 3.0 thick thermal oxide layer. Before bonding, both wafers are cleaned with solvents and activated with an atmospheric plasma containing metastable He and free-radicals of H and N. The bond is initiated in air at room temperature using a custom-built wafer bonding apparatus, and an anneal at 150° C. on a hotplate for 1 hour completes the bond. Separate bonding experiments are used to measure the bond energy of (0.91±0.16) $J/m^2$ with the double cantilever beam method. While this is leaver than other bonding recipes using SiN or $Al_2O_3$ interlayers, this direct bond minimizes the waveguide loss and is strong enough to complete the waveguide fabrication.

The GaAs substrate is removed in two steps. First, the bulk of the substrate is etched with a mixture of 350 mL $H_2O_2$ (9.8 mol/L) and 25 mL $NH_4OH$ (14.5 mol/L) using an $N_2$ bubbler to stabilize the reaction. After the 150 nm thick $Al_{0.80}Ga_{0.20}As$ etch-stop layer becomes visible (typically after 80 minutes), the wafer is transferred to a second mixture (also using an $N_2$ bubbler) with the same $H_2O_2$, but only 10 mL $NH_4OH$. Residue is removed with HCl (2.0 mol/L) for 20 s, and the etch-stop is selectively etched with HP (1.4 mol/L) for 30 s. Residual fluoride compounds produced from the HF etch are removed with A-methyl-2-pyrrolidone at 80° C. for 5 min and then $NH_4OH$ (1.3 mol/L) for 1 min. An image of the Si wafer at this point in the process with the transferred GaAs film is shown in FIG. 17(b). The RMS surface roughness, measured with atomic force microscopy, on top of the GaAs is ~0.2 nm over 9 $\mu m^2$, which is the same as the bottom surface before bonding. The thickness uniformity is measured with optical interferometry to be ±0.2% or ±0.3 nm within a 20 mm radius from the wafer center.

The GaAs waveguides are defined with electron-beam lithography and inductively-coupled, plasma (TCP) reactive-ion etching (RIE). The etch uses $BCl_3$ with 2.00 W TCP power, 100 W bias power, 5 mTorr chamber pressure, and a temperature of 20° C. By dividing the etch in two steps and measuring the GaAs thickness in between, we consistently leave a 15 nm thick GaAs slab with an error of ±1 nm, limited by the optical interferometric measurement. This GaAs slab is important to prevent exposure of the GaAs/$SiO_2$ interface to HCl, which etches the interface nonuniformly, causing phase-errors. The $SiO_2$ facets are etched with ICP-RIE using $CHF_3$ and $O_2$ gases, and the chips are released front the wafer using a deep-RIE etch of the Si substrate. A scanning electron micrograph (SEM) of the waveguide at the chip facet is shown in FIG. 17(c). We estimate the sidewall roughness as 4.5 nm RMS using a top-view SEM. Finally, the chips are cleaned with HCl (1.1 mol/L) for 10 s to minimize the As—As bonds.

Figure 18:
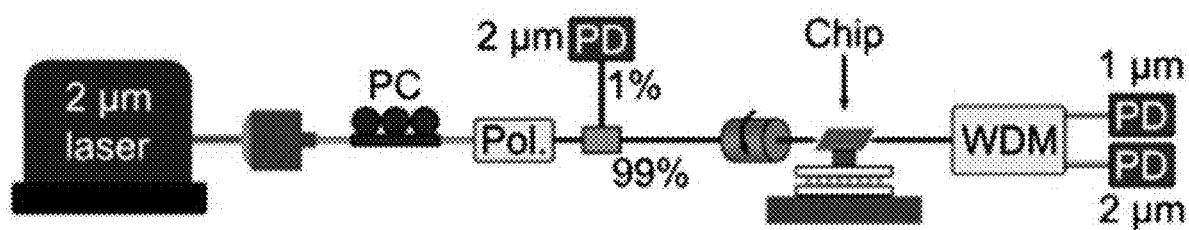
FIG. 18 shows setup for SHG. The connections are single-mode fibers and connections for polarization-maintaining single-mode fibers. PC: polarization controller; Pol.: fiber-based linear polarizer; PD: photodetector; WDM: wavelength division multiplexer for splitting the 1 and 2 light.

To measure the SHG conversion efficiency, we use a CW and tunable 2 laser to pump the waveguides in the TE-polarized mode, as shown in FIG. 18. A ~1% splitter is used to monitor the input power, and tensed fibers couple light on and off the chip. After the output fiber, a wavelength-division multiplexer (WDM) splits the TM-polarized signal and TE-polarized pump light so they can be monitored, on separate photodetectors. Similar setups are used to measure transmission at 980 nm, 1064 nm, and 1220 nm using lasers at these discrete wavelengths.

Figure 19:
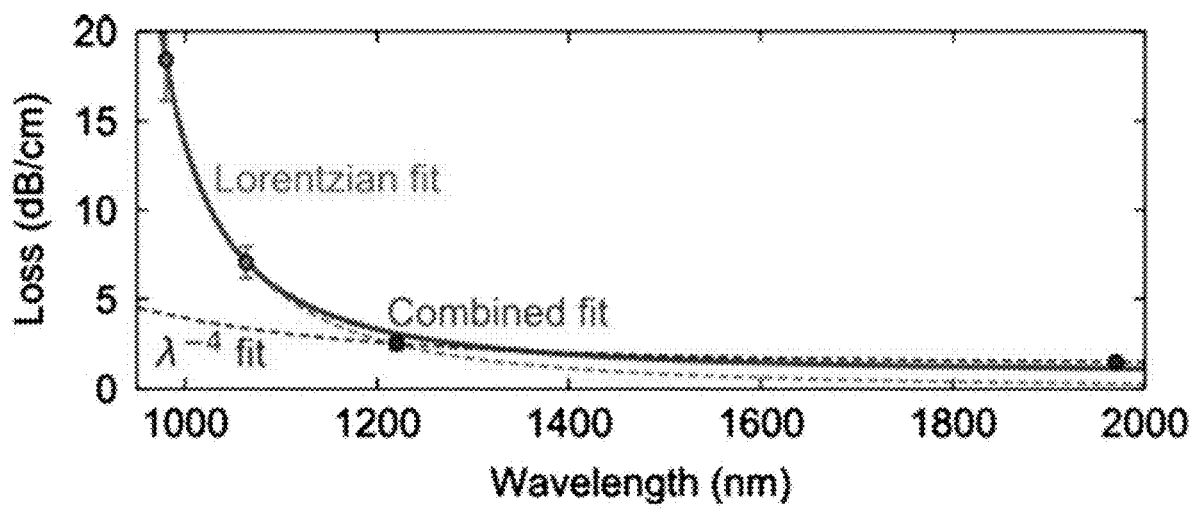
FIG. 19 shows measured propagation loss showing the trends of a Lorentzian, $\lambda^{-4}$, and a linear combination of both (solid)

Propagation losses measured near the signal and pump wavelengths are shown in FIG. 19. We fit the loss spectrum to a linear combination of a Lorentzian function and $\lambda^{-4}$ to exemplify two separate spectral trends: the absorption feature at 950 nm and the scattering loss. The waveguide loss and facet coupling for both the pump and signal modes are characterized from transmission measurements of waveguides with different lengths on a single chip. Since bends are used to create the varying waveguide lengths, a second test-structure is used to verify that the bend loss are negligible. Pump light coupling loss at the input is (5.0±0.5) dB and signal light coupling loss at the output is (12.1±0.5) dB. The increased coupling loss compared to the simulation is likely caused by residue from the die-release process, observed, in SEM imaging. Additionally, the signal light suffers from increased coupling loss due to the higher order modes in the output tensed fiber. The propagation loss for the pump mode is (1.5±0.2) dB/cm and for the signal mode is (16.8±0.8) dB/cm.

Figure 20:
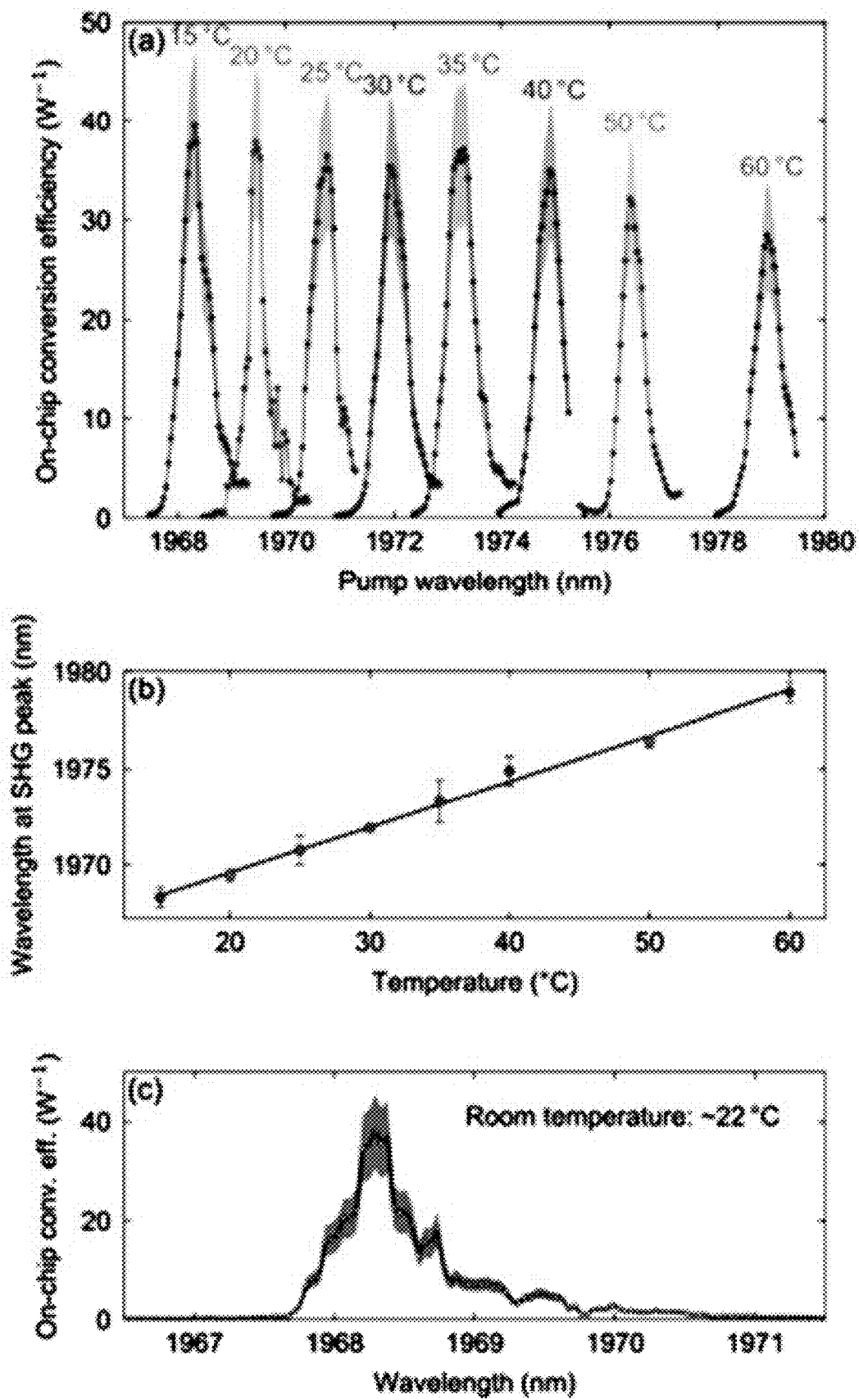
FIG. 20 shows (a) SHG spectra for various temperatures, limited by the temperature control setup. The standard error is indicated by the shaded areas. (b) Peak SHG wavelength for various temperatures with a linear fit of 0.236 nm/° C. (c) The full spectrum of the SHG conversion efficiency at room temperature (~22° C.), to show greater detail.

Conversion efficiency spectra are shown in FIG. 20(a) for a length of 2.9 mm and a range of temperatures. The peak efficiency is (39.5±7.9) $W^{-1}$ at 0.15° C. and decreases to (28.5±5.7) $W^{-1}$ at 60° C. The uncertainty is calculated from the coupling loss variation across the chip. The change in peak SHG wavelength with temperature is 0.236 nm/° C., as shown in FIG. 20(b). The wavelength uncertainty arises from mode-hopping in the laser, and it is calculated from repeated measurements. We also measured SHG at 25° C. from devices with lengths of 6.3 mm and 9.7 mm, but the efficiency decreases to (31.4±6.2) $W^{-1}$ and (15.2±3.0) $W^{-1}$, respectively. The complete SHG spectrum is shown in FIG. 20(c) at room temperature (~22° C.), to show greater detail than the temperature controlled measurements in FIG. 20(a).

Phase errors resulting from thickness non-uniformity likely limit the nonlinear conversion for the longer waveguides that produce lower conversion efficiency. This is evident from the SHG spectral shape from FIG. 20(c) that does not show a clean $sinc^2$ function. By extrapolating the uniformity measurement from across the wafer to within the length of the SHG waveguide, we estimate that the average GaAs thickness varies by up to ~20 pm. Compared to $\Delta h$ from FIG. 16 of ~7 pm, this thickness variation is very significant. The average width of the waveguide may not vary significantly compared to $\Delta w$ of ~1 nm. The 2.9 mm long device may be more uniform than the maximum variation of ~20 pm because it was located close to the center of the wafer, where the thickness variation is minimal.

Reduction, of the waveguide loss at the signal wavelength involves minimizing As—As bonds at the GaAs surface at two different steps in the fabrication process. First, the bonding surface of the GaAs waveguide layer must be allowed to form a native oxide after the MBE growth, which is not removed before bonding. This direct, bond between the native GaAs-oxide surface and the $SiO_2$ surface is optimal to reduce the As—As bonds. The second step is the surface treatment of the top and sidewall of the GaAs waveguide. Similarly, a native oxide is preferred, but only-after an HCl strip of the surface reconstruction layer (the amorphous surface layer naturally formed in air). This allows for a native oxide to grow with minimal As—As bonds. Propagation loss of the signal is (20.4±1.4) dB/cm when the native oxide is stripped with HCl before bonding, and the waveguides are stripped with HCl after etching. When the bonding is performed with the native GaAs oxide, the loss of the signal is (34.6±3.7) dB/cm before treating the waveguides with HCl.

As indicated from the propagation loss spectrum, this device has some As—As bonds, and the loss from this defect state can still be improved. A process to further reduce As—As bonds is to use atomic layer deposition (ALD) to passivate the surface. However, attempts with ALD $Al_2O_3$ passivation produced higher loss than the current process. Also, the loss at the pump wavelength indicates that our sidewall roughness may have a significant contribution. Further optimization of lithography and etching process may reduce the loss by decreasing scattering for both the signal and pump wavelengths.

At the elevated temperatures the decreased SHG conversion efficiency may be due to an increase in propagation losses. Free-carrier absorption in the GaAs for the signal is expected to increase with temperature, and the peak wavelength of the As—As defect state is strongly temperature dependent. The conversion efficiency does not degrade after the thermal cycling between 15° C. and 60° C., so the loss is not a permanent effect. Regardless, we find that the conversion efficiency is consistent from 15° C. to 40° C. An f-2f self-referenced comb can reasonably be stabilized in this temperature range.

Similar SHG results were measured immediately following and several months after the fabrication, showing no measurable degradation in performance. The peak efficiency, bandwidth, and operation wavelength did not vary more than our measurement error within this time frame. These results show that the SHG performance is not affected by oxidation or other chemical reactions with the GaAs.

A 76 mm wafer-scale GaAs-on-insulator platform was made as an SHG device compatible with heterogeneous integration on a SiN PIC for f-2f self-referencing and optical frequency synthesis. SHG conversion efficiency of 40 $W^{-1}$ (470 $W^{-1}cm^{-2}$) in a 0.5 nm bandwidth is demonstrated from a single-pass device because of improvements made to the propagation loss and the waveguide uniformity. Efficient SHG operation is confirmed over a temperature range of 45° C. With these conversion efficiency achievements, one can make a fully-integrated chip-scale f-2f system. To improve SHG conversion efficiency, quasi-phase-matching provides optimization of the nonlinear mode-overlap and for implementing greater phase-matching tolerance. Applying orientation patterning to the GaAs platform is expected to produce even higher SHG conversion efficiencies, exceeding 100 $W^{-1}$ with a broader bandwidth of $>10^3$ GHz.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or" It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A self-referencing nonlinear frequency converting photonic waveguide for self-referencing nonlinear frequency conversion, the self-referencing nonlinear frequency converting photonic waveguide comprising:
    a substrate;
    a dielectric layer disposed on the substrate with an input terminus at which input light propagates toward an output terminus opposingly disposed from the input terminus,
    a supercontinuum generator section disposed at the input terminus on the dielectric layer and comprising:
        $Al_xGa_yAs_z$;
        a supercontinuum input optical taper disposed at the input terminus and that receives input light, the supercontinuum input optical taper tapering toward the input terminus;
        a supercontinuum nonlinear optical member in optical communication with the supercontinuum input optical taper and that receives the input light from the supercontinuum input optical taper and produces supercontinuum light from the input light, the supercontinuum light spanning an optical octave with respect to the input light; and
        a supercontinuum output optical taper in optical communication with the supercontinuum nonlinear optical member and that receives the supercontinuum light and the input light from the supercontinuum nonlinear optical member and propagates the supercontinuum light and the input light from the supercontinuum generator section, the supercontinuum output optical taper tapering away from the input terminus,
        a first height H1 relative to a surface of the dielectric layer on which the supercontinuum generator section is disposed;
        a first width W1 of supercontinuum nonlinear optical member orthogonal to a direction propagation of supercontinuum light in supercontinuum generator section; and
    a second harmonic generator section disposed on the supercontinuum output optical taper and the dielectric layer and that extends on the dielectric layer from the supercontinuum output optical taper towards the output terminus and comprising:
        $Al_xGa_yAs_z$ that provides birefringent modal phase matching;
        a second harmonic input optical taper disposed on the supercontinuum output optical taper and that receives the supercontinuum light and the input light from the supercontinuum output optical taper, the second harmonic input optical taper tapering toward the supercontinuum output optical taper;
        a second harmonic nonlinear optical member in optical communication with the second harmonic input optical taper and that receives the supercontinuum light and the input light from the second harmonic input optical taper and produces second harmonic light from the supercontinuum light and the input light, the second harmonic light comprising a second harmonic of the supercontinuum light;
        a second harmonic output optical taper disposed at the output terminus in optical communication with the second harmonic nonlinear optical member and that receives the second harmonic light, the supercontinuum light, and the input light from the second harmonic nonlinear optical member and co-propagates the second harmonic light, the supercontinuum light, and the input light from the second harmonic generator section toward the output terminus as output light, the second harmonic output optical taper tapering away from the second harmonic nonlinear optical member toward the output terminus;
        a second height H2 relative to the surface of the dielectric layer on which the second harmonic generator section is disposed;
        a second width W2 of supercontinuum nonlinear optical member orthogonal to a direction propagation of second harmonic light in the second harmonic generator section,
    such that the first height H1 is greater than or equal to the second height H2, and the first width W1 is less than or equal to second width W2.

2. The self-referencing nonlinear frequency converting photonic waveguide of claim 1, further comprising a passivation layer disposed on the supercontinuum generator section.

3. The self-referencing nonlinear frequency converting photonic waveguide of claim 1, further comprising a second dielectric medium disposed on the supercontinuum generator section.

4. The self-referencing nonlinear frequency converting photonic waveguide of claim 1, wherein the substrate comprises silicon.

5. The self-referencing nonlinear frequency converting photonic waveguide of claim 1, wherein the dielectric layer comprises silicon dioxide.

6. The self-referencing nonlinear frequency converting photonic waveguide of claim 1, wherein the dielectric layer comprises a gas.

7. The self-referencing nonlinear frequency converting photonic waveguide of claim 1, wherein the input light is pulsed and comprises a central wavelength from 1200 nm to 2500 nm.

8. The self-referencing nonlinear frequency converting photonic waveguide of claim 1, wherein the supercontinuum light comprises a wavelength from 600 nm to 3000 nm.

9. The self-referencing nonlinear frequency converting photonic waveguide of claim 1, wherein the second harmonic light comprises a central wavelength from 600 nm to 1250 nm.

10. A detector for detecting a frequency of a carrier envelope offset, the detector comprising:
a self-referencing nonlinear frequency converting photonic waveguide comprising:
a substrate;
a dielectric layer disposed on the substrate with an input terminus at which input light propagates toward an output terminus opposingly disposed from the input terminus;
a supercontinuum generator section disposed at the input terminus on the dielectric layer and comprising:
$Al_xGa_yAs_z$, wherein x is a number from 0 atomic percent (at. %) to 99.9 at %; y is a number from 1 at. % to 55 at. %, and z is a number from 1 at. % to 55 at. %, based on a total of all atoms in the supercontinuum generator section;
a supercontinuum input optical taper disposed at the input terminus and that receives input light, the supercontinuum input optical taper tapering toward the input terminus;
a supercontinuum nonlinear optical member in optical communication with the supercontinuum input optical taper and that receives the input light from the supercontinuum input optical taper and produces supercontinuum light from the input light, the supercontinuum light spanning an optical octave with respect to the input light; and
a supercontinuum output optical taper in optical communication with the supercontinuum nonlinear optical member and that receives the supercontinuum light and the input light from the supercontinuum nonlinear optical member and propagates the supercontinuum light and the input light from the supercontinuum generator section, the supercontinuum output optical taper tapering away from the input terminus,
a first height H1 relative to a surface of the dielectric layer on which the supercontinuum generator section is disposed;
a first width W1 of supercontinuum nonlinear optical member orthogonal to a direction propagation of supercontinuum light in supercontinuum generator section; and
a second harmonic generator section disposed on the supercontinuum output optical taper and the dielectric layer and that extends on the dielectric layer from the supercontinuum output optical taper towards the output terminus and comprising:
$Al_xGa_yAs_z$ that provides birefringent modal phase matching, wherein x is a number from 0 atomic percent (at. %) to 99.9 at. %; y is a number from 1 at. % to 55 at. %, and z is a number from 1 at. % to 55 at. %, based on a total of all atoms in the second harmonic generator section;
a second harmonic input optical taper disposed on the supercontinuum output optical taper and that receives the supercontinuum light and the input light from the supercontinuum output optical taper, the second harmonic input optical taper tapering toward the supercontinuum output optical taper,
a second harmonic nonlinear optical member in optical communication with the second harmonic input optical taper and that receives the supercontinuum light and the input light from the second harmonic input optical taper and produces second harmonic light from the supercontinuum light and the input light, the second harmonic light comprising a second harmonic of the supercontinuum light;
a second harmonic output optical taper disposed at the output terminus in optical communication with the second harmonic nonlinear optical member and that receives the second harmonic light, the supercontinuum light, and the input light from the second harmonic nonlinear optical member and co-propagates the second harmonic light, the supercontinuum light, and the input light from the second harmonic generator section toward the output terminus, the second harmonic output optical taper tapering away from the second harmonic nonlinear optical member toward the output terminus;
a second height H2 relative to the surface of the dielectric layer on which the second harmonic generator section is disposed;
a second width W2 of supercontinuum nonlinear optical member orthogonal to a direction propagation of second harmonic light in the second harmonic generator section,
such that the first height H1 is greater than or equal to the second height H2, and the first width W1 is less than or equal to second width W2;
a wavelength splitter in optical communication with the self-referencing nonlinear frequency converting photonic waveguide and that:
receives the output light from the self-referencing nonlinear frequency converting photonic waveguide; and
produces combination signal and broadened spectrum from the output light;
a photodetector in optical communication with the wavelength splitter and that receives the combination signal from the wavelength splitter and produces photosignal from the combination signal;
a spectrum analyzer in electrical communication with the photodetector and that receives the photosignal and produces an analyzer signal from the photosignal; and
an electrical stabilizer in electrical communication with the spectrum analyzer and that receives the analyzer signal from the spectrum analyzer, produces a feedback signal from the analyzer signal, and communicates the feedback signal to a laser source that produces the input light based on the feedback signal.

11. The detector of claim 10 further comprising the laser source that produces the input light based on the feedback signal from the electrical stabilizer before communicating the input light to the self-referencing nonlinear frequency converting photonic waveguide.

12. A process for self-referencing nonlinear frequency conversion with the self-referencing nonlinear frequency converting photonic waveguide of claim 1, the process comprising:
    receiving the input light by the supercontinuum input optical taper;
    communicating the input light from the supercontinuum input optical taper to the supercontinuum nonlinear optical member;
    receiving the input light by the supercontinuum nonlinear optical member
    subjecting, by the input light, the input light to anomalous group velocity dispersion;
    producing, by the supercontinuum nonlinear optical member, the supercontinuum light from the input light in response to subjecting the input light to the anomalous group velocity dispersion and birefringent phase matching in the supercontinuum nonlinear optical member;
    communicating the supercontinuum light and the input light from the supercontinuum nonlinear optical member to the supercontinuum output optical taper;
    receiving the input light and the supercontinuum light by the supercontinuum output optical taper and communicating the supercontinuum light and the input light from the supercontinuum output optical taper to the second harmonic input optical taper;
    receiving the input light and the supercontinuum light by the second harmonic input optical taper and communicating the supercontinuum light and the input light from the second harmonic input optical taper to the second harmonic nonlinear optical member;
    receiving the supercontinuum light and the input light by the second harmonic nonlinear optical member and producing, by the second harmonic nonlinear optical member, the second harmonic light from the supercontinuum light and the input light; and
    communicating the second harmonic light, the supercontinuum light, and the input light from the self-referencing nonlinear frequency converting photonic waveguide as output light;
    producing a feedback signal based on the output light; and
    producing the input light that is feedback stabilized by the feedback signal prior to receiving the input light by the supercontinuum input optical taper to perform self-referencing nonlinear frequency conversion.

13. The process of claim 12, wherein producing, by the supercontinuum nonlinear optical member, the supercontinuum light comprises making an optical octave in the supercontinuum nonlinear optical member from the input light.

14. The process of claim 13, wherein producing, by the second harmonic nonlinear optical member, the second harmonic light comprises frequency doubling a low frequency range of the supercontinuum light.

15. The process of claim 14, further comprising measuring the frequency of the carrier envelop offset by comparing the second harmonic light to a high frequency range of the supercontinuum light to perform f-to-2f self-referencing.

16. The process of claim 12, further comprising:
    receiving, by the wavelength splitter, the output light from the self-referencing nonlinear frequency converting photonic waveguide; and
    producing, by the wavelength splitter, the combination signal and broadened spectrum from the output light.

17. The process of claim 12, further comprising:
    receiving, by the photodetector, the combination signal from the wavelength splitter; and
    producing, by the photodetector, the photosignal from the combination signal.

18. The process of claim 12, further comprising:
    receiving, by the spectrum analyzer, the photosignal; and
    producing, by the spectrum analyzer, the analyzer signal from the photosignal.

19. The process of claim 12, further comprising:
    receiving, by the electrical stabilizer, the analyzer signal from the spectrum analyzer;
    producing, by the electrical stabilizer, a feedback signal from the analyzer signal;
    communicating, by the electrical stabilizer, the feedback signal to a laser source; and
    producing, by the laser source, the input light based on the feedback signal.

* * * * *